(12) United States Patent
Hofer et al.

(10) Patent No.: US 9,566,631 B2
(45) Date of Patent: Feb. 14, 2017

(54) DEVICE AND METHOD FOR PRODUCING CLUTCH BODIES THAT ARE SUITABLE FOR SYNCHRONIZER SYSTEMS AND PROVIDED WITH TEETH OR TOOTH SECTIONS

(71) Applicant: FEINTOOL International Holding AG, Lyss (CH)

(72) Inventors: Patrick Hofer, Lyss (CH); Marc Schneeberger, Lyss (CH); Andreas Marti, Jegenstorf (CH)

(73) Assignee: FEINTOOL INTERNATIONAL HOLDING AG, Lyss (CH)

( * ) Notice: Subject to any disclaimer, the term of this patent is extended or adjusted under 35 U.S.C. 154(b) by 0 days.

(21) Appl. No.: 14/817,802

(22) Filed: Aug. 4, 2015

(65) Prior Publication Data
US 2016/0038991 A1 Feb. 11, 2016

(30) Foreign Application Priority Data
Aug. 5, 2014 (EP) .................................. 14002730

(51) Int. Cl.
*B21D 28/00* (2006.01)
*B21D 53/28* (2006.01)
*B21D 28/16* (2006.01)
*F16D 23/02* (2006.01)

(52) U.S. Cl.
CPC ............ *B21D 28/002* (2013.01); *B21D 28/16* (2013.01); *B21D 53/28* (2013.01); *F16D 23/025* (2013.01)

(58) Field of Classification Search
CPC ..... B21D 28/002; B21D 28/12; B21D 28/125; B21D 28/16; B21D 53/28; B21J 5/12; B21K 1/30
See application file for complete search history.

(56) References Cited

U.S. PATENT DOCUMENTS

| | | | | |
|---|---|---|---|---|
| 5,076,882 A | * | 12/1991 | Oyanagi | B21J 5/12 156/500 |
| 5,382,101 A | * | 1/1995 | Iguchi | B41J 2/515 347/190 |
| 5,901,628 A | * | 5/1999 | Sakamoto | B21D 28/12 83/552 |

FOREIGN PATENT DOCUMENTS

| | | |
|---|---|---|
| DE | 2222080 | 11/1973 |
| EP | 2263812 | 12/2010 |

* cited by examiner

*Primary Examiner* — Teresa M Ekiert
(74) *Attorney, Agent, or Firm* — Norris McLaughlin & Marcus, P.A.

(57) ABSTRACT

A method and apparatus for producing clutch bodies, which are suitable for synchronizer systems and provided with teeth or tooth sections, from a blank uses and includes at least one embossing stage, composed of embossing segments and an anvil, for embossing roofs and troughs between root and tip circles into an upper face of the blank, and transfer means for transporting the blanks, First embossing segments form a first section and second embossing segments form a second section for sequential embossing within the at least one embossing stage, wherein the first embossing segments first emboss a first section, then return in relation to the second embossing segments, and thereafter the second embossing segments emboss the second section, wherein the second embossing segments are disposed next to each other in an annular arrangement, and the second embossing segments are designed to be axially movable relative to the first embossing segments of the first section.

13 Claims, 26 Drawing Sheets

PRIOR ART

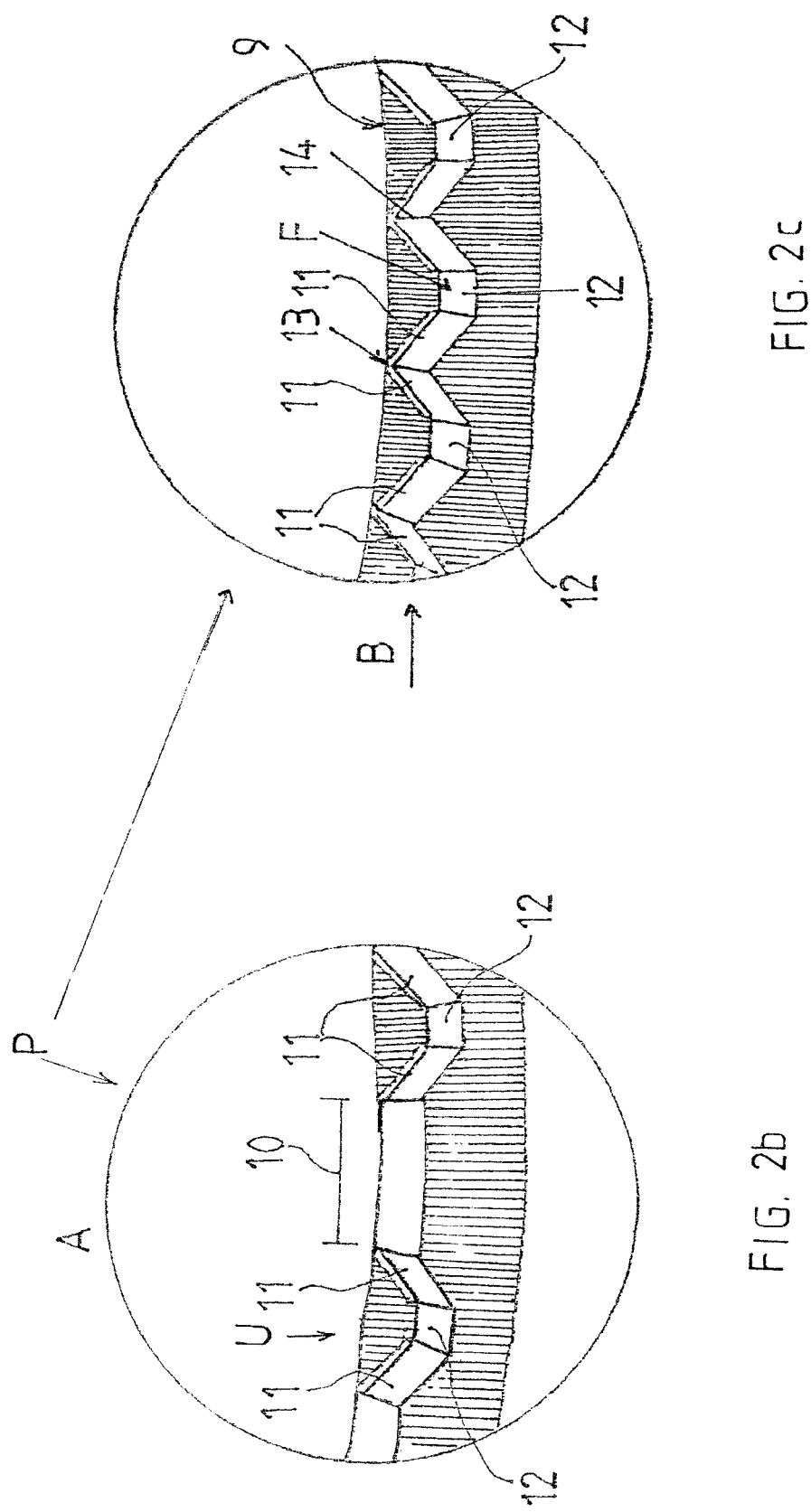

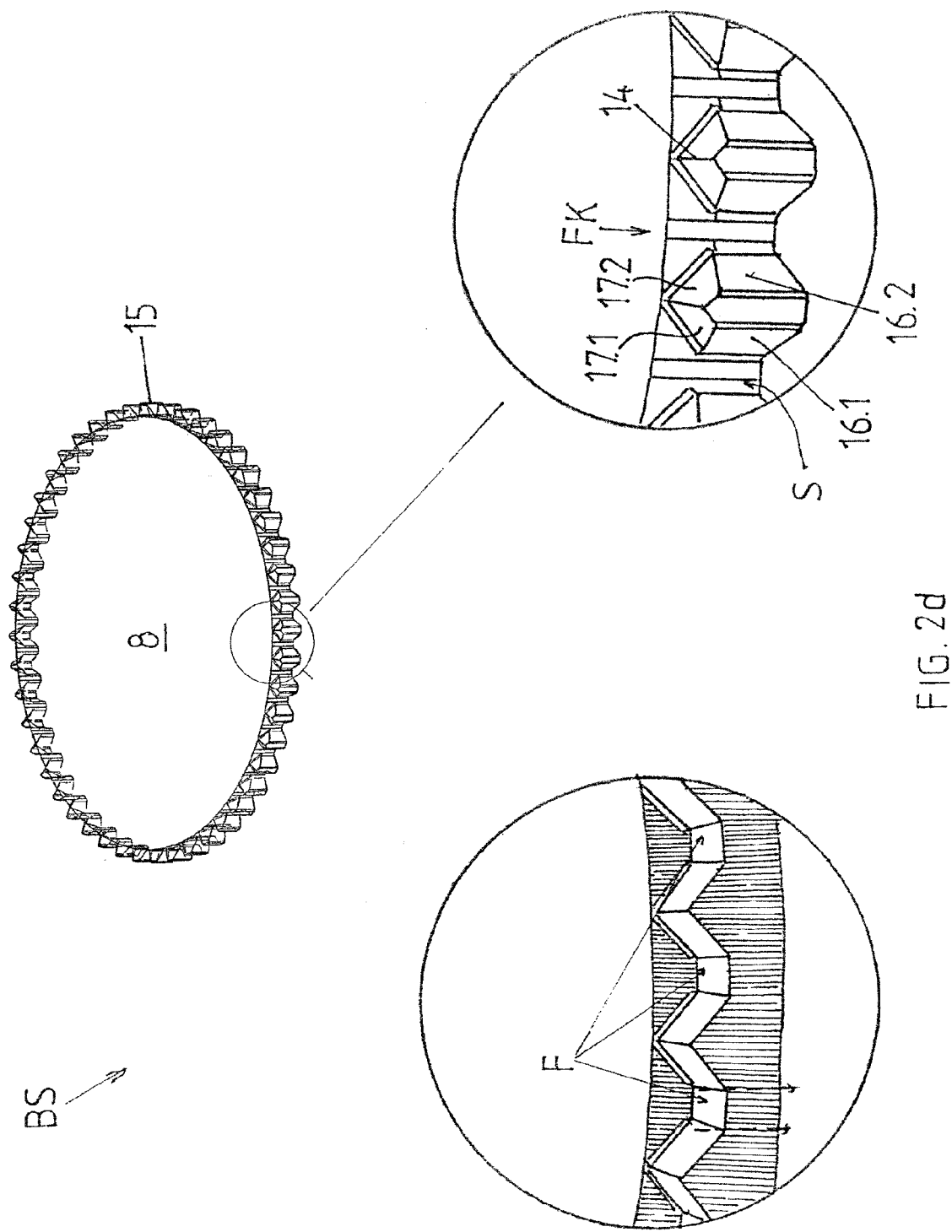

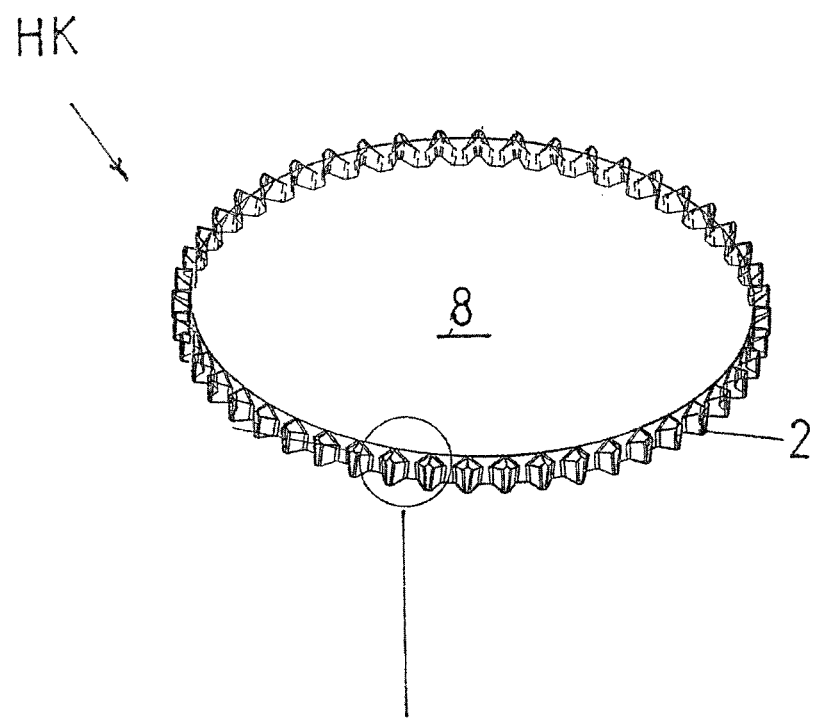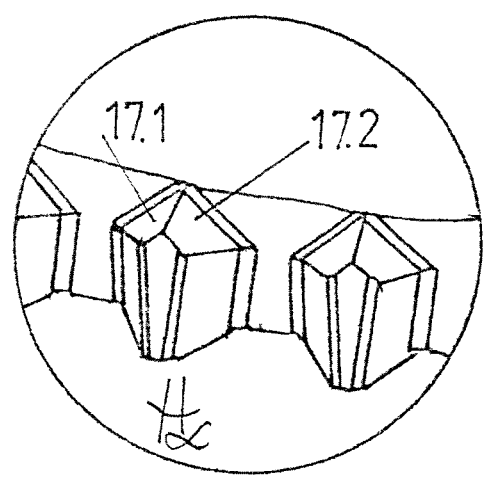
FIG. 2f

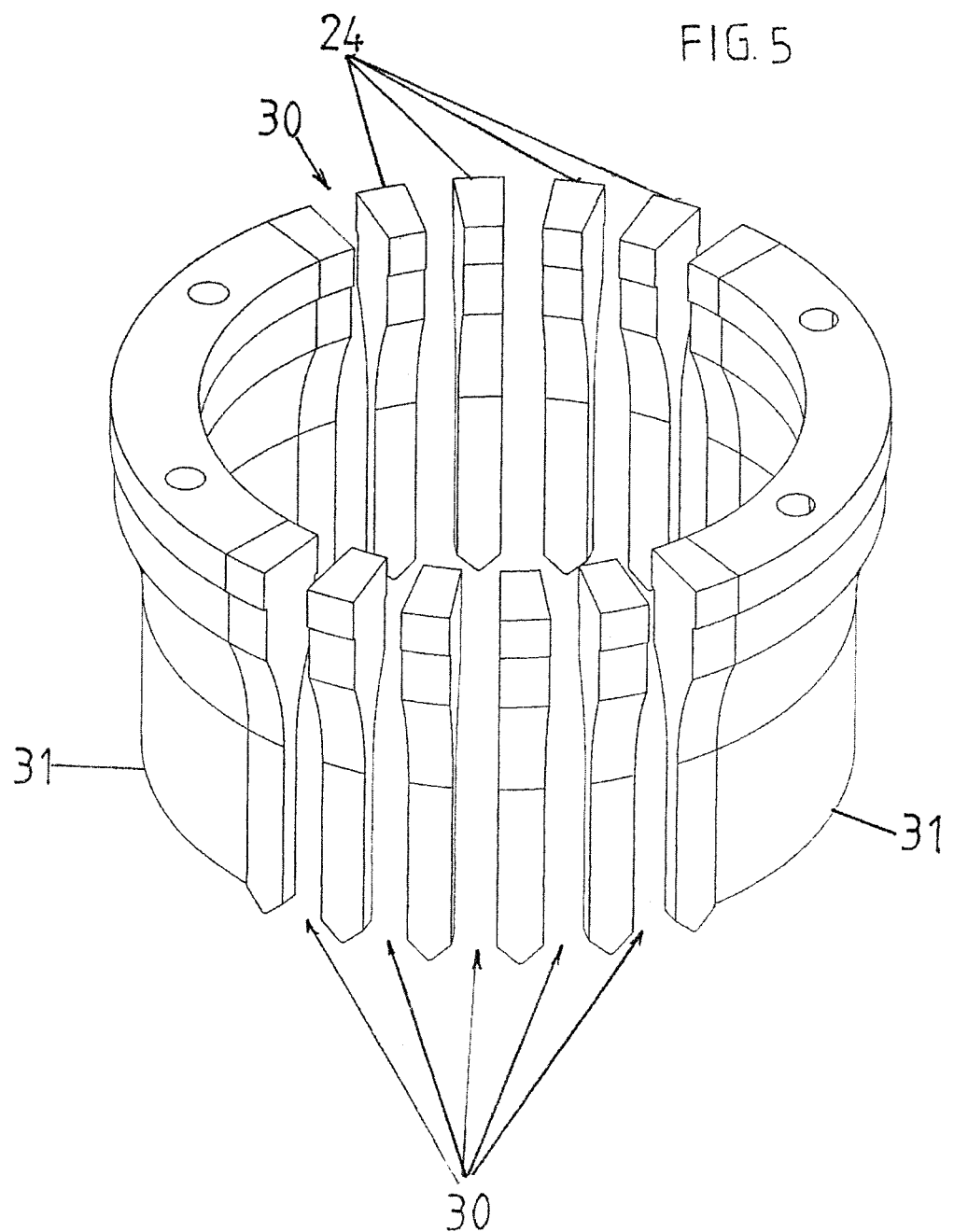

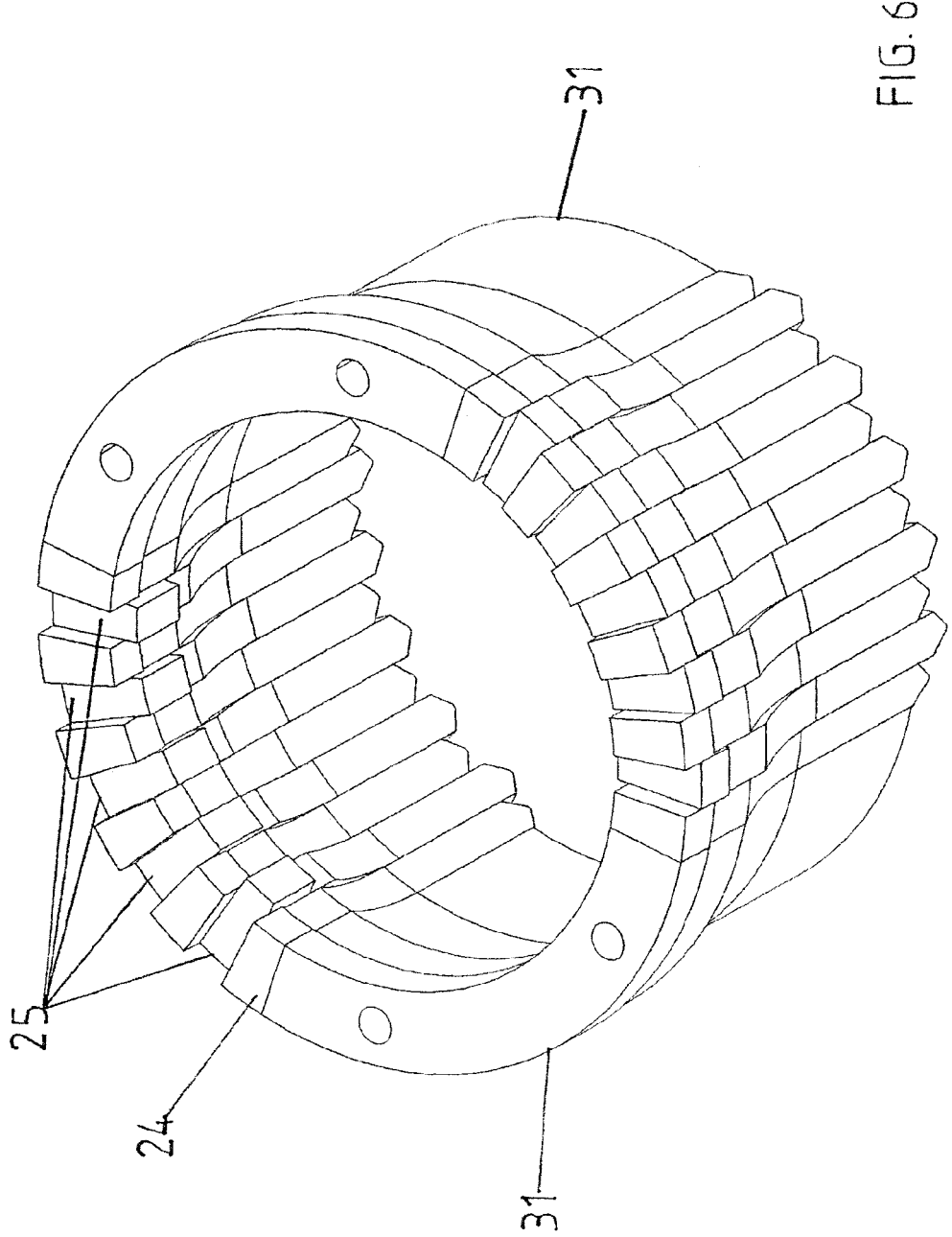

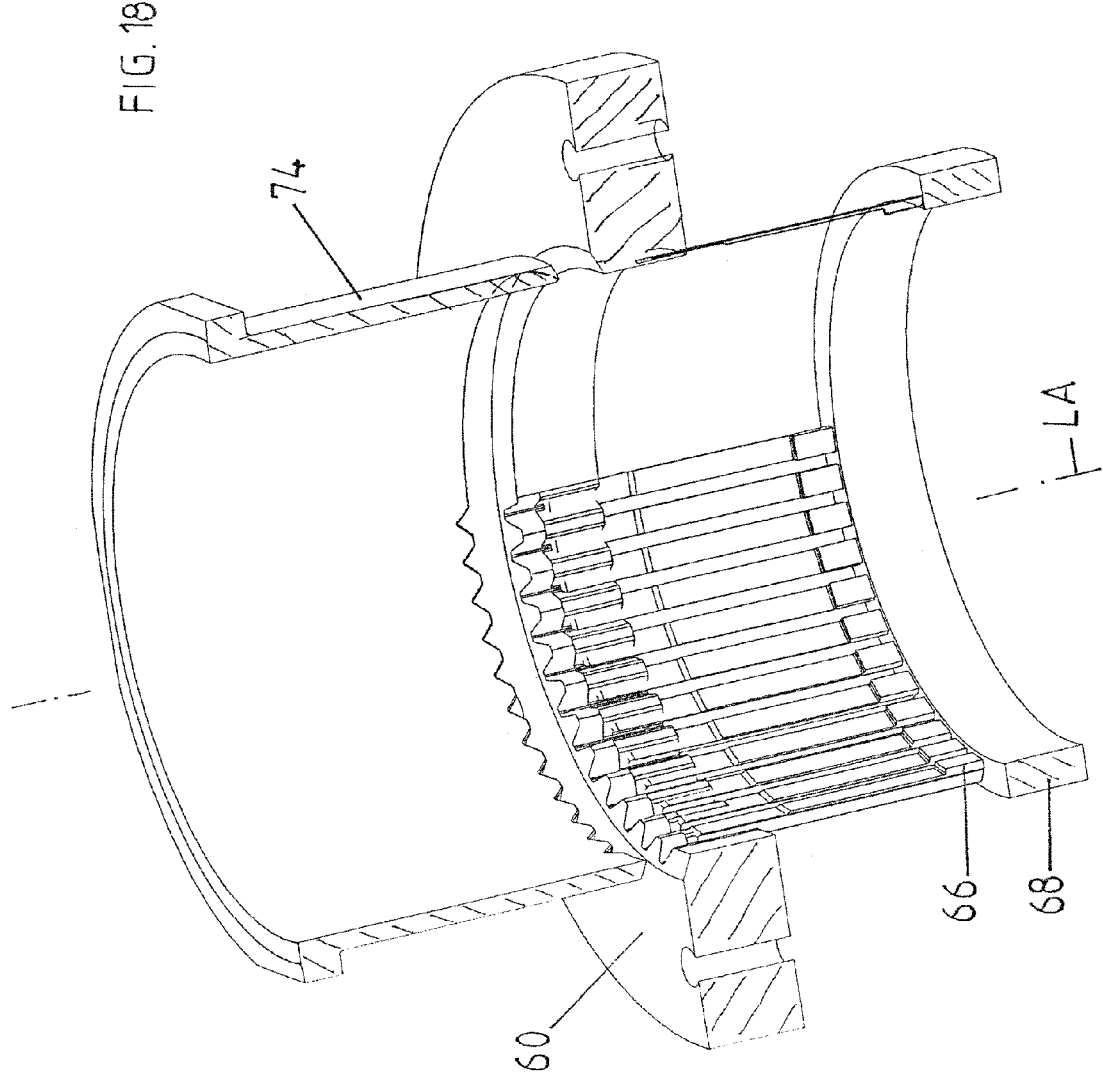

DEVICE AND METHOD FOR PRODUCING CLUTCH BODIES THAT ARE SUITABLE FOR SYNCHRONIZER SYSTEMS AND PROVIDED WITH TEETH OR TOOTH SECTIONS

BACKGROUND OF THE INVENTION

The invention relates to a device for producing clutch bodies, which are suitable for synchronizer systems and provided with teeth or tooth sections (both of which my be referred to simply as "teeth"), from a blank using at least one embossing stage, composed of embossing segments and an anvil, for embossing roofs and troughs between the root and tip circles into an upper face of the blank, and transfer means for transporting the blanks.

The invention further relates to a method for producing clutch bodies, which are suitable for synchronizer systems, from a blank using an embossing stage, which comprises at least embossing segments and an anvil and in which troughs and roofs in the edge region close to the circumference arranged next to each other in a ring-like manner are introduced into the upper face of the blank by way of embossing along a root circle and tip circle of the future teeth or tooth sections.

A method for producing stamped parts, in particular synchronizer rings, clutch bodies or clutch plates, is known from EP 2 263 812 A1 in which, in one method step, the strip stock to be worked is clamped between the hold-down elements of a fine blanking tool, and in a further method step at least the teeth are embossed. In a first process step, an impact pre-embossing step is carried out on the strip stock at least in the region of the teeth that are to be cut out later, and subsequently the fine blanking method step is carried out in conjunction with an impact extrusion step on the strip stock. The teeth are formed by way of a fine blanking operation and subjected to impact extrusion at the same time, during which they are displaced into a free volume created by way of pre-embossing.

Impact pre-embossing, which is nothing other than embossing, forces a change in the shape of the strip stock, preserving the cohesion and volume of the material.

This is associated with the disadvantage that stresses or compressions are created in the embossing region of the strip stock as a result of the changes in shape and geometry, which can impair the flatness of the strip to be cut and the dimensional accuracy of the future teeth.

Moreover, DE 2 222 080 A1 describes a method and a die for producing clutch bodies for synchromesh gears comprising teeth, which have a tooth profile having roof-like axial displacement surfaces on the flank side and stepped head surfaces on the end face side, forming stop lugs, for engaging an associated selector sleeve. The teeth are initially fine blanked, and then the tooth profile is embossed. For this purpose, the stamped teeth are in each case pre-embossed in a die comprising a hollow mold corresponding to the tooth profile and subsequently, with the die closed, finished by way of a displacement punch that is moved into the hollow mold, filling the hollow mold.

This known method is very complex since the teeth must be fed consecutively to the die, or each tooth must be assigned a dedicated die. In addition, the teeth must be stamped in an undersized dimension, so that flawless filling of the hollow mold is achieved with the required fine dimension.

SUMMARY OF THE INVENTION

With this prior art in mind, It is the object of the invention to provide a device and a method for producing clutch bodies that are suitable for synchronizer systems and provided with teeth or tooth sections, which considerably improve the trueness to shape and dimensions and the precision of clutch bodies, while also increasing cost effectiveness and avoiding rework.

The solution according to the invention is based on the finding that the change in shape and geometry created by pre-embossing is thereby avoided and a planar blank that is substantially free from stresses for the subsequent production of teeth is achieved.

This is made possible in that the embossing segments form a first section and the embossing segments form a second section for sequential embossing within the embossing stage, wherein the embossing segments first emboss the section, then recede in relation to the embossing segments, and thereafter the embossing segments emboss the section, wherein the embossing segments are disposed next to each other in a shared annular arrangement, and the embossing segments are designed so as to be axially movable relative to the embossing segments of the first section, and the device moreover comprises the following:

a) a trimming stage for cutting the troughs free to form tooth bodies that project upwardly at the end face side on the blank and have tooth flanks and roofs; and b) an undercutting and shaping stage for creating undercuts in the tooth flanks and shaping the roofs of the tooth body to the net shape by way of embossing punches and a shaping anvil cooperating with the embossing punches.

According to a preferred embodiment of the device according to the invention, the roofs together with troughs of the first section and second section form a shared forming region, which is disposed between the root and tip circles of the future teeth close to the edge in the blank.

The sequential stepped introduction of roofs and troughs in the region close to the edge of the blank ensures even outflow of the material volume displaced by embossing in the direction of the edge of the blank, and prevents unevenness of the blank.

In a further embodiment of the invention, the first section of embossing segments through the 1st, 3rd, 5th and nth embossing segment and the second section of embossing segments through the 2nd, 4th, 6th and n-1 th embossing segment form the annular arrangement, the diameter of which corresponds to the tip circle of the future teeth, wherein the embossing segments of the first section can be filled by at least one filler piece so that clutch bodies having different numbers of teeth and configurations can be created.

According to a further embodiment of the invention, the embossing segments of the first and second sections each comprise a shaft having an embossing foot, which includes embossing surfaces having identical shapes and dimensions and a roof ridge, wherein the roof ridge is oriented perpendicularly to the root circle and tip circle.

In a further embodiment of the device according to the invention, the shafts of the embossing segments of the first and second sections are provided with hammer head-like trapezoidal heads, which have protrusion-like shoulders with respect to the shafts, wherein the shoulders of the movable embossing segments limit the axial movement on the inner lower holding plate, and the head is laterally guided by cut-outs that are introduced on the outer circumference of the inner upper holding plate and spaced by teeth, and the shoulders of the fixed embossing segments are held on the teeth of the inner upper holding plate in a force-fit manner by a pressure plate, so that the fixed embossing segments are fixed with respect to the movable embossing segments.

It is furthermore advantageous that a pressure piece is assigned to each of the movable embossing segments of the section for transmitting the axial movement, the pressure piece being operatively connected to a pressure piece ring on which pressure pins are evenly distributed, multiple pressure pins being combined to form a group under a shared bridge, which in each case maintain the force fit with the embossing segments by way of a pressure piece.

In a further preferred embodiment of the device according to the invention, at least one cutting punch, a die plate and an ejector are provided in the trimming stage, the geometries of which are adapted to the tooth flank shape of the future teeth.

The trimming stage ensures that the troughs between the root and tip circles are cut free from material to such an extent that in each case two adjoining roofs, together with the respective sheared edges of the 1st section and 2nd section, can form a tooth body on the end face of the blank, without necessitating complex forming/impact extrusion, so that no stresses generated by forming are introduced into the tooth region of the blank.

According to a further preferred embodiment of the device according to the invention, a sleeve-like embossing the is provided for undercutting and shaping the cut-free tooth body in the undercutting and shaping stage, the inner wall of the embossing the being provided with recesses between the root and tip circles disposed parallel to the die axis, which are positioned so that they are associated in each case with the cut-free troughs, wherein embossing punches are disposed in the recesses, which comprise shafts having conically increasing cross-sections in the direction of movement for undercutting the tooth flanks of the tooth body and a roof-like head for shaping the roof shape, and a shaping anvil is provided, the shaping surface of which is adapted to the roof shape and geometry of the teeth.

In a further preferred embodiment of the invention, the embossing punches are held radially by holding plates and a disk-shaped pressure pad disposed on top of each other in the embossing the perpendicular to the die axis, wherein the embossing punches have a support side that faces the end faces of the pressure pad and holding plates.

In a preferred embodiment of the invention, a pressure piece ring is associated with the embossing punches at the foot end and is held in force fit with a the pressure plate by way of pressure pins, so that the desired net shape and geometry can be imparted to the tooth flanks.

The embossing punches have a prismatic elongated shape for this purpose, which is adapted to the tooth flank shape, wherein the support side is provided with protrusions for supporting or for holding the holding plates and the pressure pad.

The object is further achieved by a method comprising the following steps:

a) introducing roofs and troughs by way of a first embossing step, in which the roofs together with the troughs are positioned at equal distances from each other in an annular arrangement, and by way of a second roofs and troughs embossing step following the first embossing step, in which the distances in the annular arrangement are filled with roofs and troughs, wherein the first embossing step and the second embossing step are carried out in a single embossing stage;

b) trimming the troughs to remove a material region at the respective lowest points thereof, so that tooth bodies are created at the end face of the blank along the root circle having tooth flanks and roofs without embossing; and c) undercutting the tooth flanks by way of embossing using embossing punches and shaping the roof shape of the roofs by way of a shaping anvil that is adapted to the roof shape.

Further advantages, features and details of the invention will be apparent from the following description with reference to the accompanying drawings.

The invention will be described in more detail hereafter based on the example of producing a clutch body having outer teeth. It goes without saying that the invention also covers synchronizer parts, parts having roof-shaped teeth, or clutch parts.

BRIEF DESCRIPTION OF THE DRAWINGS

In the drawings:

FIGS. 2a to 2f show schematic illustrations of the sequence of the production of the clutch body using the method according to the invention;

FIGS. 5 and 6 show annular arrangements of the fixed and movable embossing segments of the embossing stage;

FIG. 18 shows a detailed view of the inner guide of the embossing punches.

DETAILED DESCRIPTION OF THE INVENTION

Figure 1A:
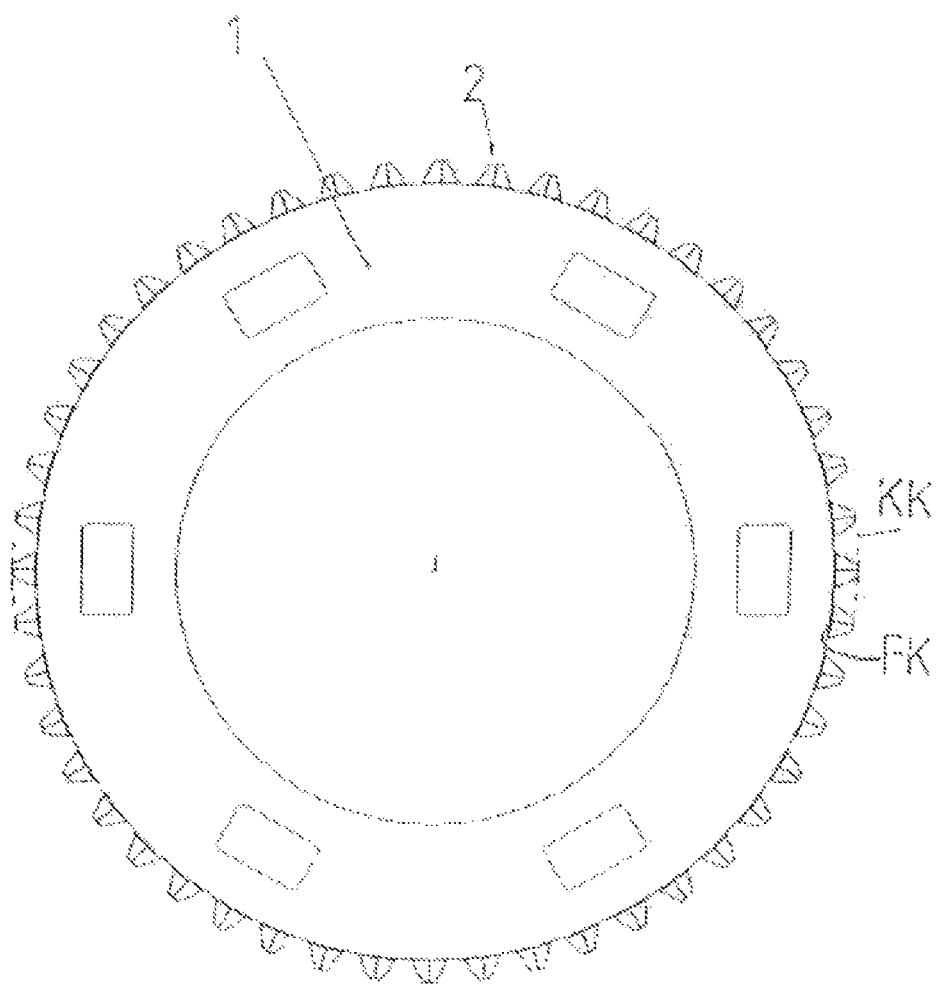
FIGS. 1a and b show views of a conventional clutch body.
Figure 1B:
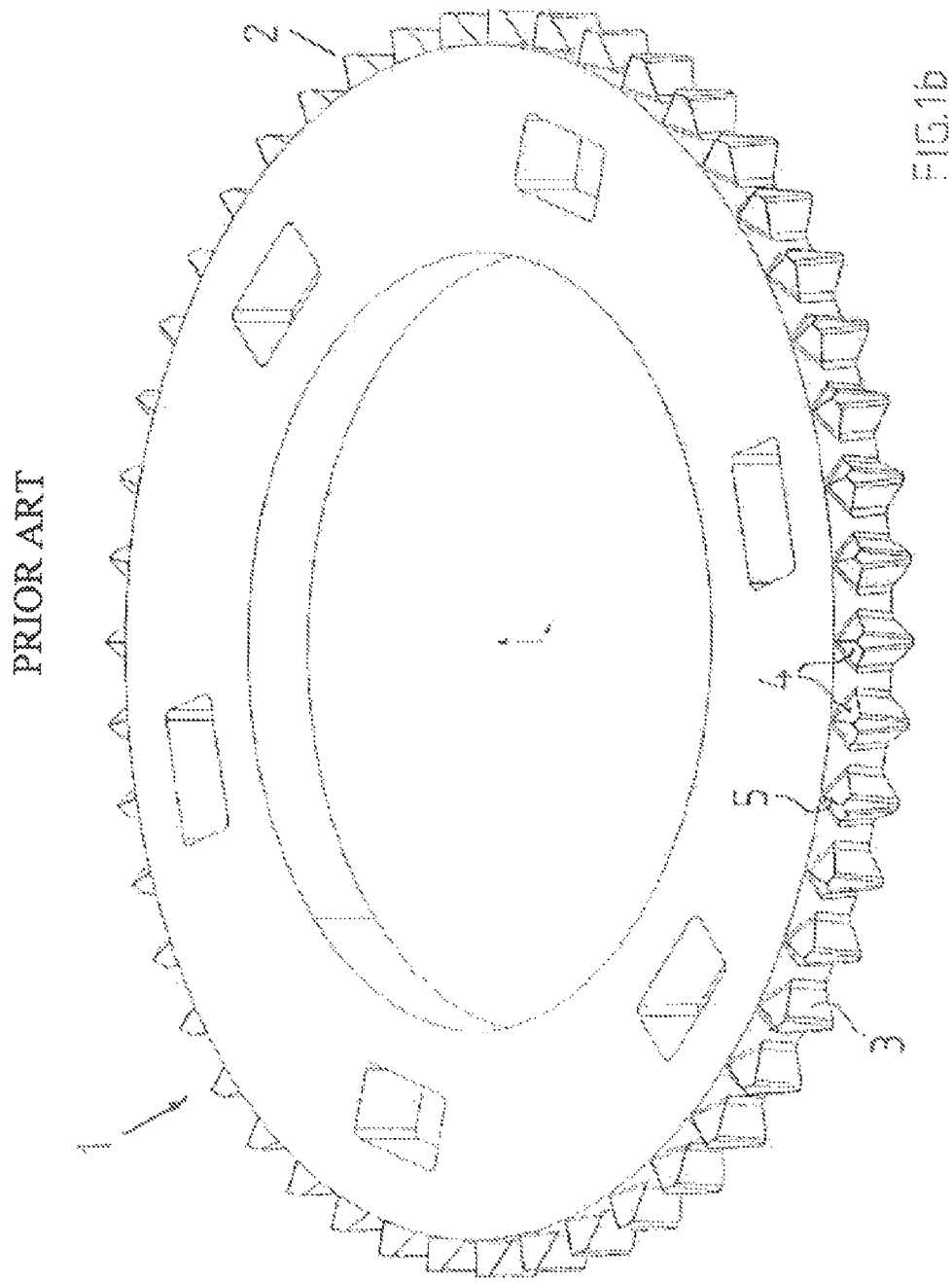
Figure 2A:
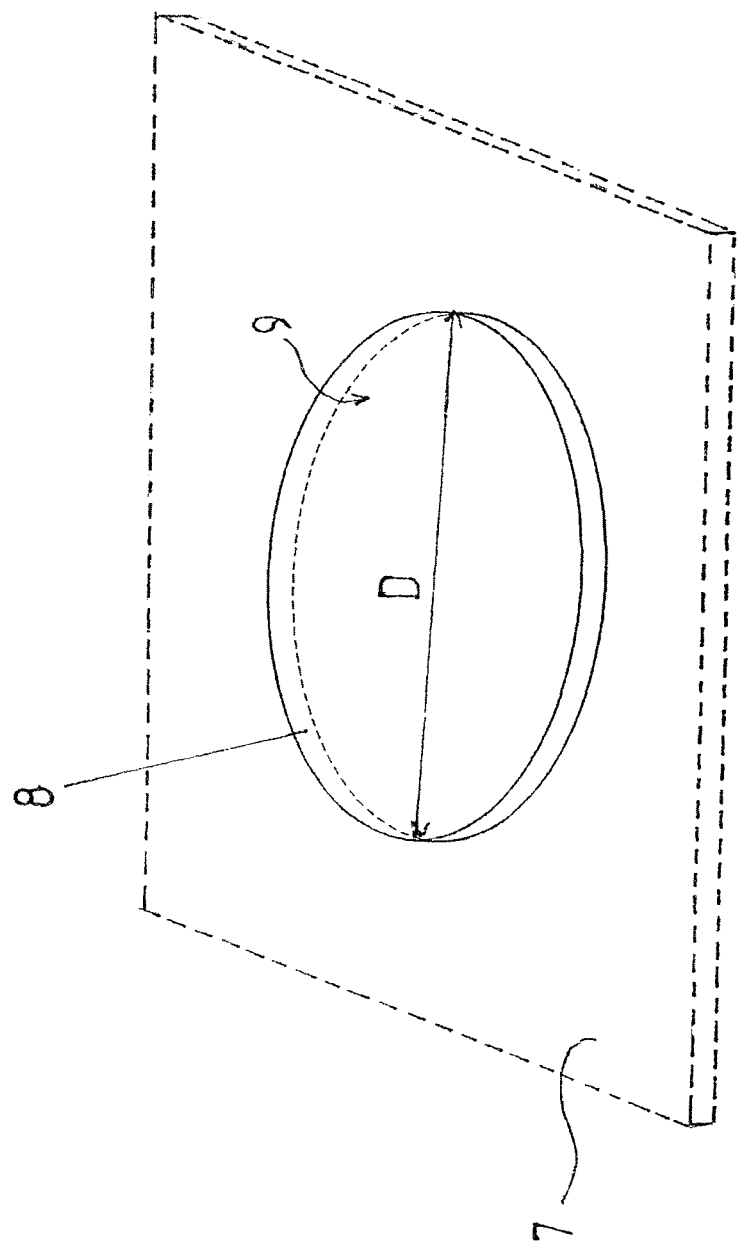
Figure 2E:
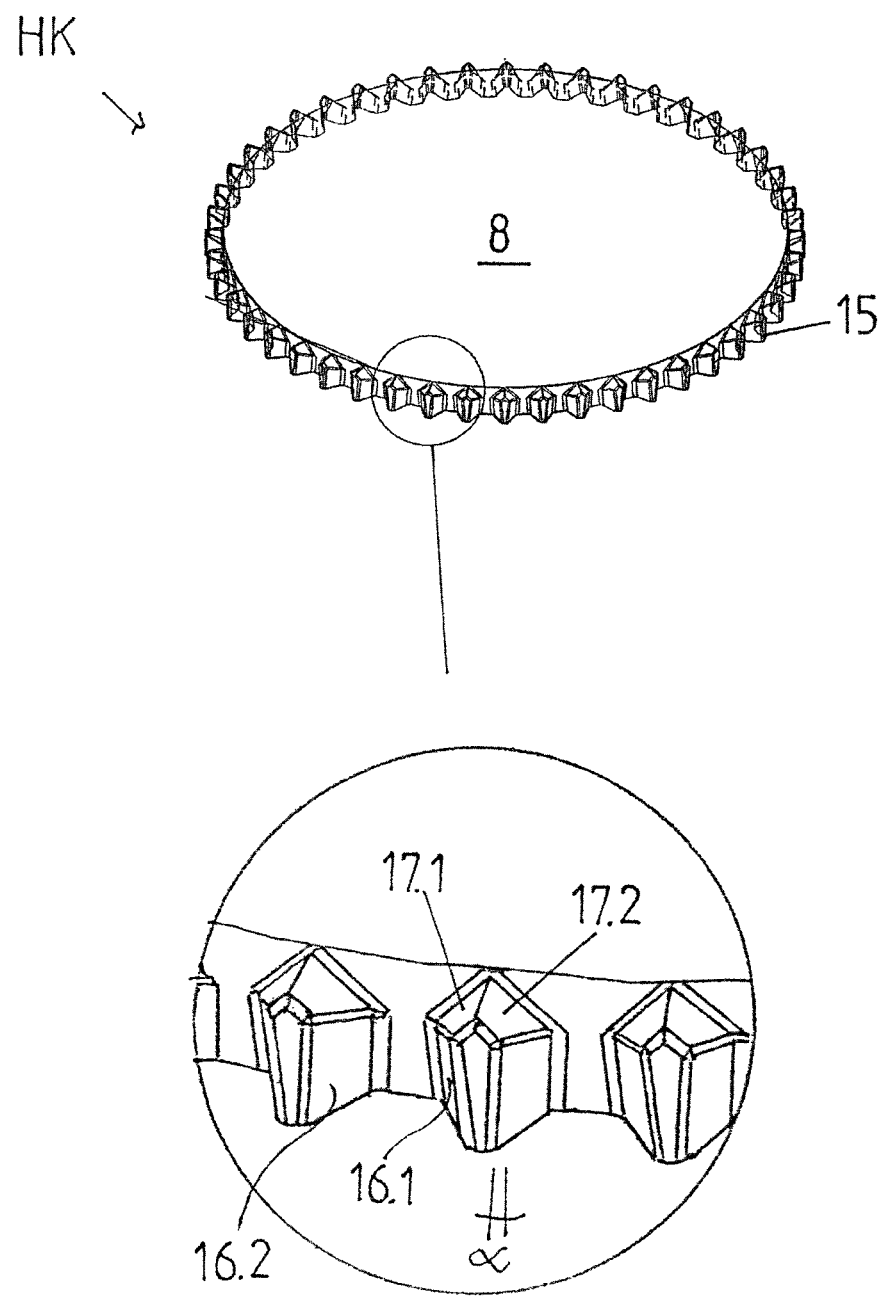

FIGS. 1a and 1b show one example of a clutch body 1 for a synchromesh gear. This clutch body includes cogging having teeth 2, which comprise recessed tooth flanks 3, roof surfaces 4 converging in a ridge 5, and a flattened head surface 6 (see FIG. 1b). In FIG. 1a, the tip circle KK and the root circle FK of the teeth are identified.

FIGS. 2a to 2f show the essential sequence of the method according to the invention for producing such a clutch body.

In a first step (see FIG. 2a), a blank 8 is cut out of a flat strip 7, wherein the diameter D of the blank 8 has an undersized dimension that is adjusted to the change in shape resulting from embossing. Cutting out takes place by way of a known fine blanking tool, which essentially comprises an upper part having a guide or knife-edge ring plate, a cutting punch and an ejector, and a lower part having a the plate and an ejector. Further representation may thus be dispensed with.

By a transfer means, which is not shown in more detail, the blank 8 is fed to the next process step, the embossing stage P, in which in a first embossing step roofs 11 that are spaced apart from each other by distances 10 are impressed in the region of the upper face 9 of the bank 8 dose to the edge between the tip circle KK and the root circle FK. The roofs 11 disposed next to each other in each case converge in troughs 12, wherein the distances 10 are dimensioned so that the lengths 1 and widths b correspond to two converging roofs 11.

In a second embossing step following the first embossing step, the distances 10 are provided with further roofs 11 connected to troughs 12 (see FIG. 2b). Along the region dose to the edge, this creates a self-contained, tooth ring-like forming region that is oriented vertically in the direction of the upper face of the blank 8, wherein the tooth tips 13 are formed of a roof 11 generated in the first embossing step and a roof 11 embossed in the second embossing step as the distances 10 are closed, and the ridges 14 of the roofs 11 are located in the plane of the upper face of the blank 8 and delimited by the root circle FK. The special feature of sequential embossing of the first and second sections is that the two embossing steps are carried out in a single forming stage P.

The position and shape of the toothed ring-like forming region U is shown in FIG. 2c. It is clearly apparent that the ridge 14 is created by the roof 11 that is generated in the first embossing section abutting a roof 11 that is generated in the second embossing section. The troughs 12 in each case represent the lowest region of the adjoining roofs 11 which is formed by a surface F disposed parallel with respect to the upper face of the blank 8.

In the trimming stage B (see FIG. 2d), which is the subsequent process step, the material of the forming region U beneath the surface F is cut free, so that tooth bodies 15 are created along the root circle FK at the end face S of the blank 8 without embossing. The tooth bodies 15 are formed by the tooth flanks 16.1 and 16.2 and roof surfaces 17.1 and 17.2 each converging at the ridge 14.

In the process step of the undercutting and shaping stage HK (see FIGS. 2e and 2f), the tooth flanks 16.1 and 16.2 of adjoining tooth bodies 15 are formed in a first sub-step by way of an embossing or undercutting punch 63 (see FIG. 17), which creates undercuts in the tooth flanks 16.1 and 16.2 at an angle α of 5°, for example. The roof surfaces 17.1 and 17.2 are then shaped in a second sub-step by a shaping anvil 74 (see FIG. 18) that is adapted to the future roof shape, so that the final tooth shape on the tooth body 1 is created.

Figure 3:
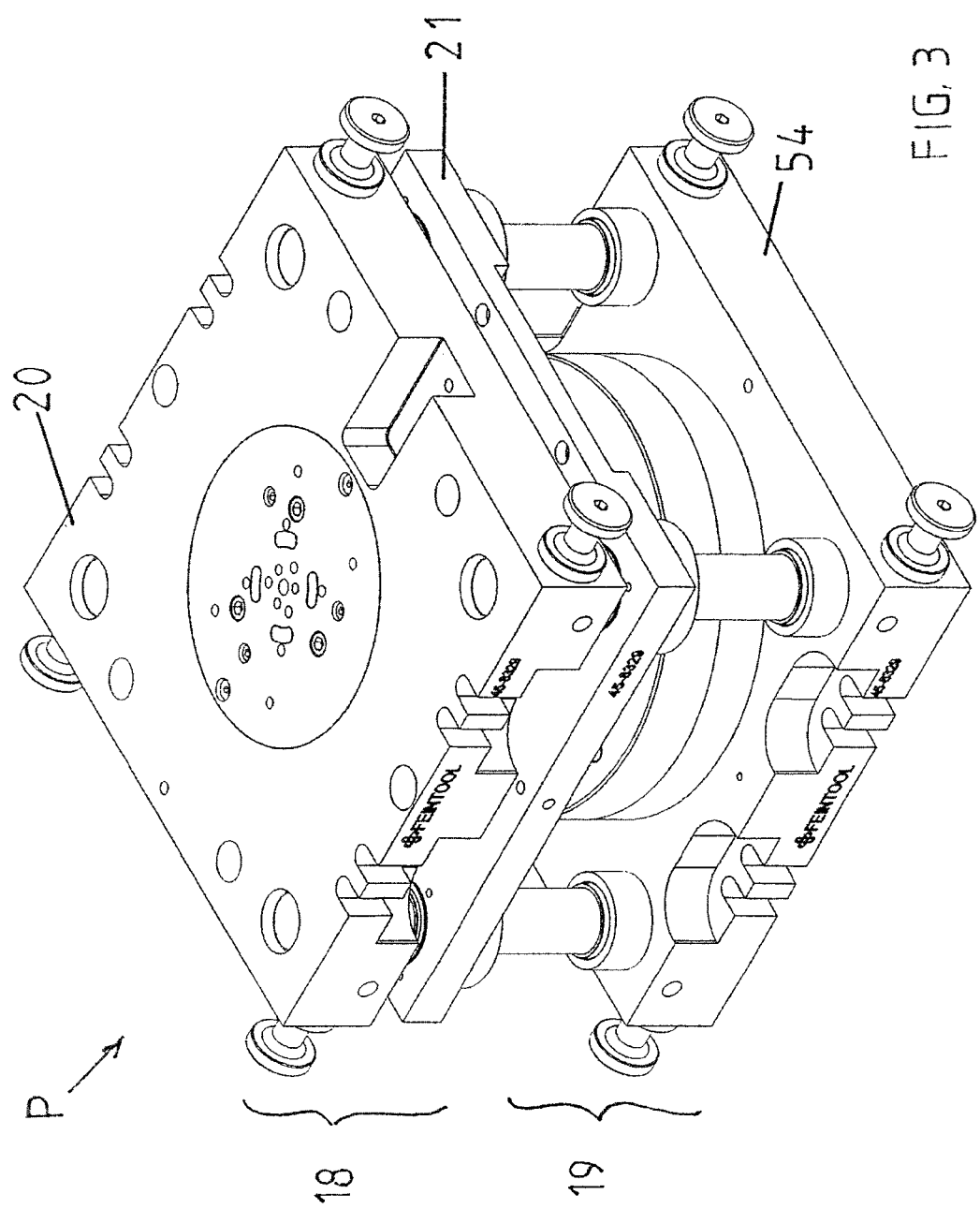
FIG. 3 shows a perspective view of the embossing stage of the device according to the invention.
Figure 4A:
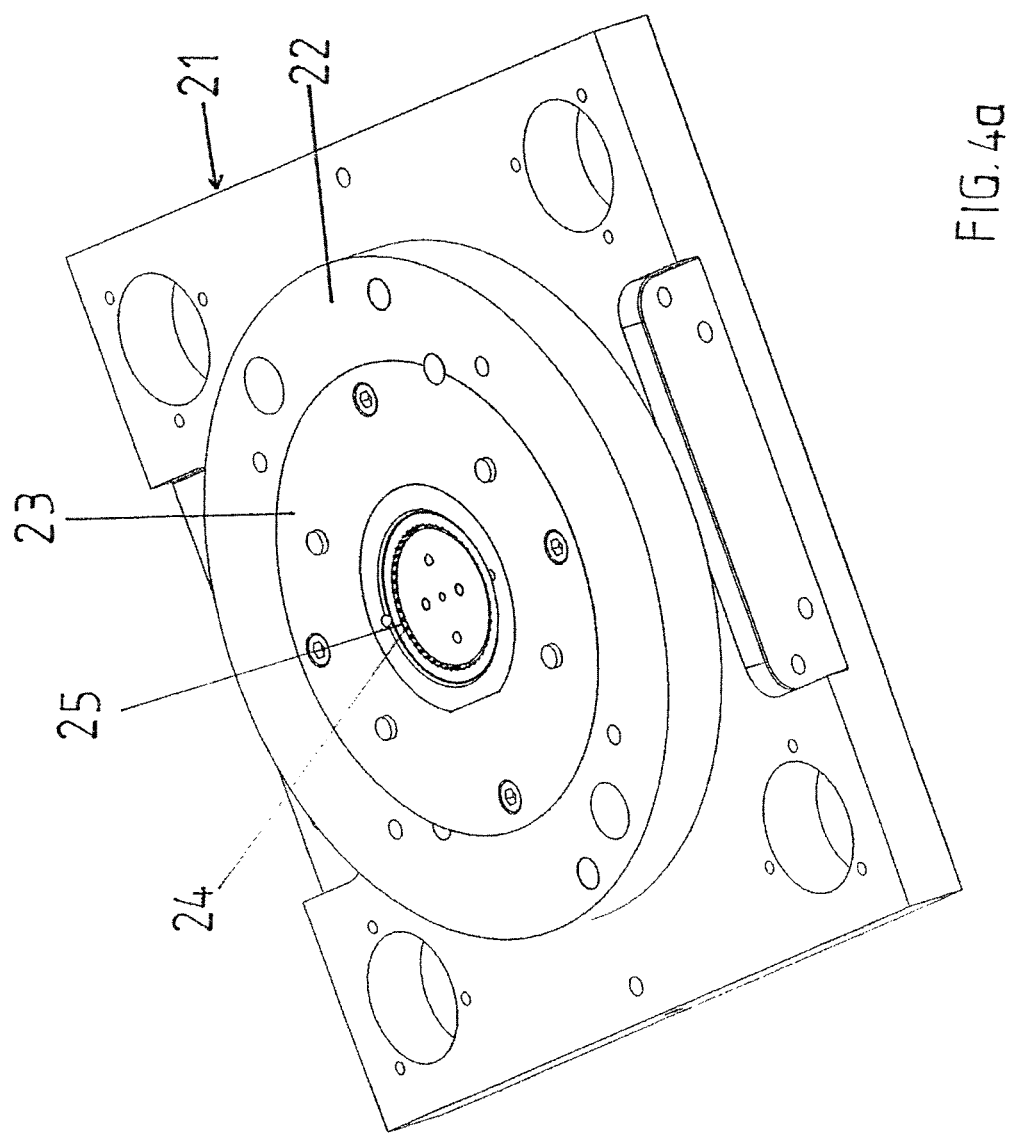
FIG. 4a shows a perspective illustration of a bottom view of the embossing stage comprising a guide plate, without the upper block.
Figure 4B:
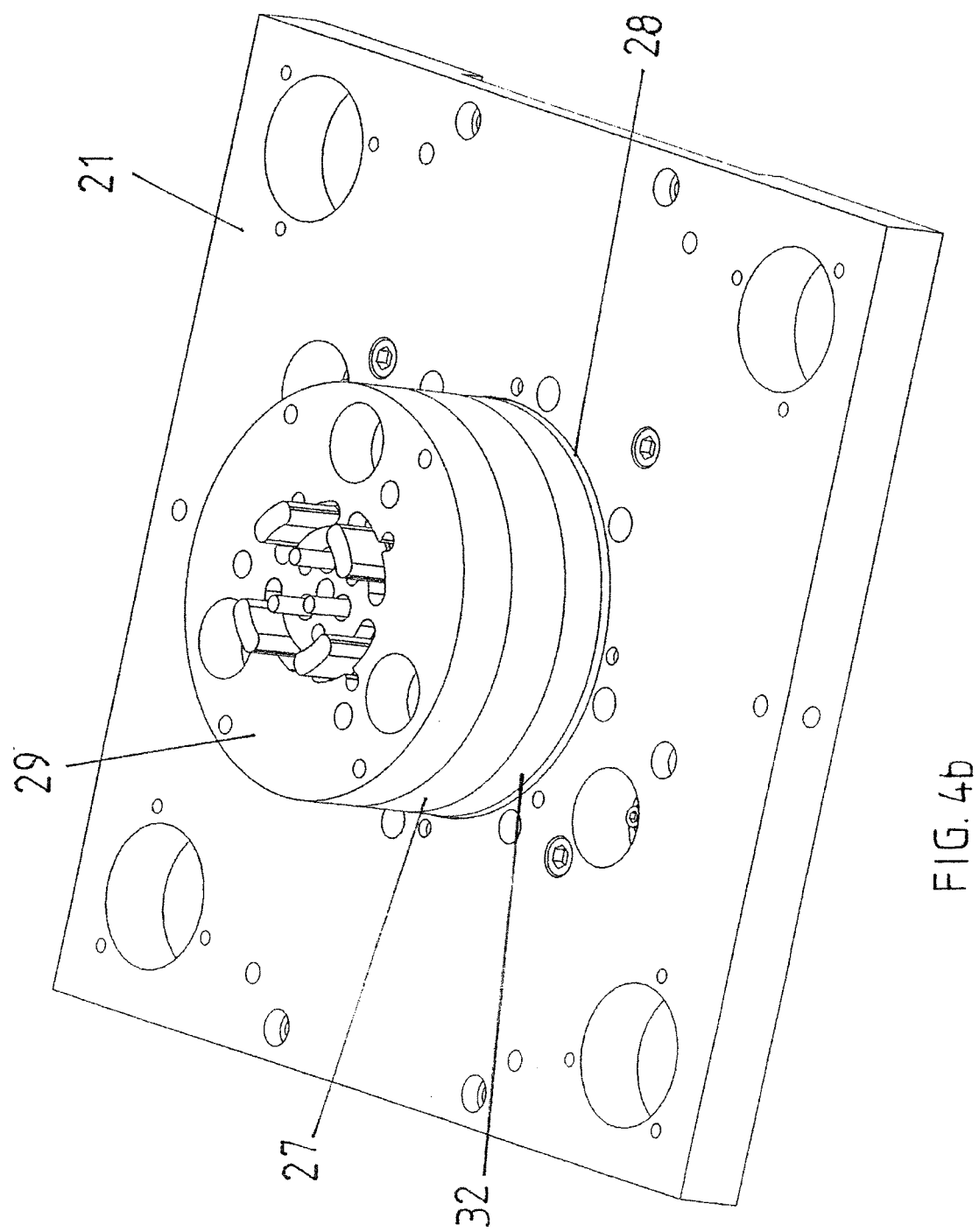
FIG. 4b shows a perspective illustration of a top view of the embossing stage comprising a guide plate, without the upper block.
Figure 4C:
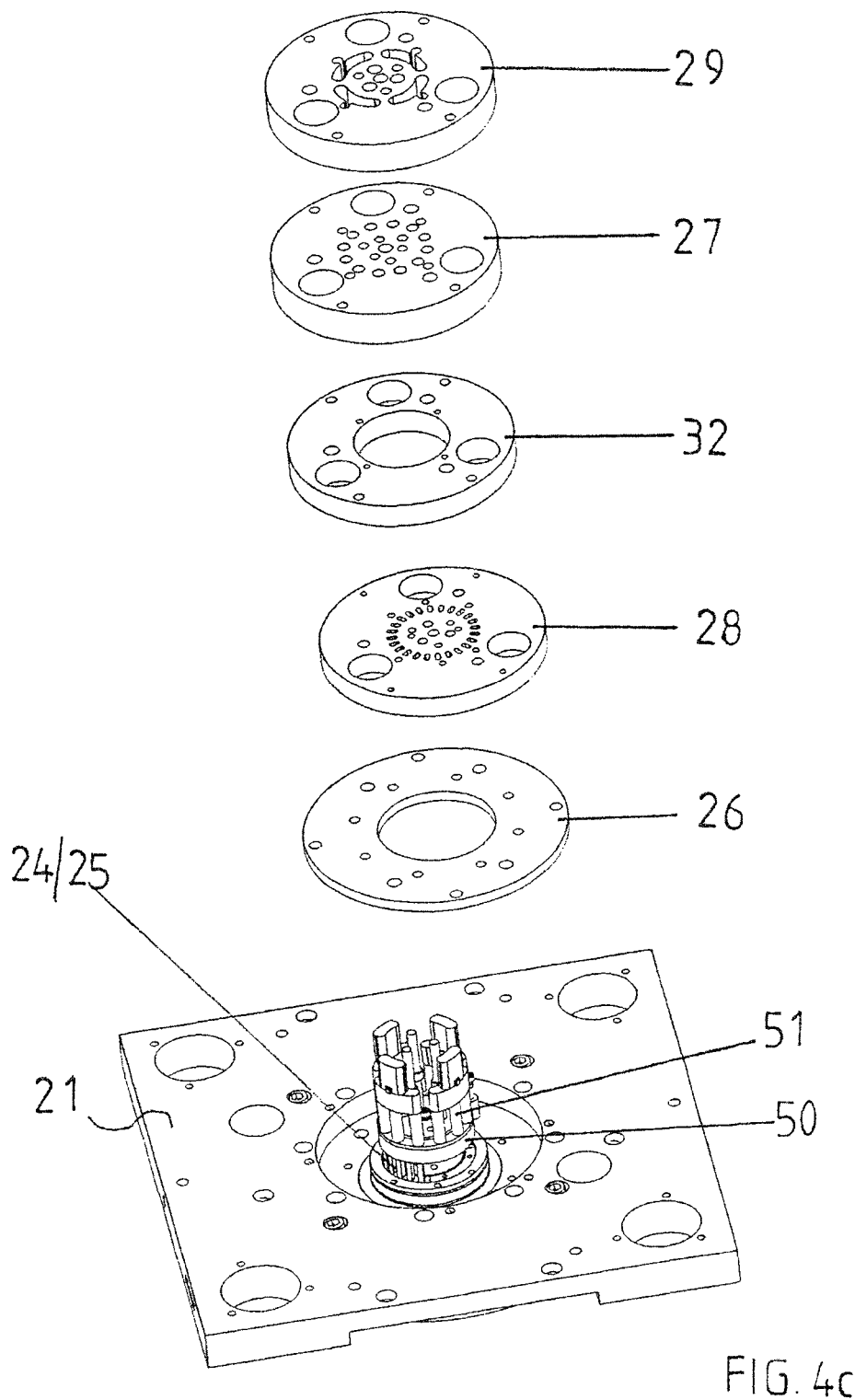
FIG. 4c shows an exploded view according to FIG. 4b.

Reference is now made to FIGS. 3 to 12. FIG. 3 shows a perspective view of the embossing stage P of the device according to the invention, The embossing stage P comprises an upper part 18 and a lower part 19. The upper part 18 includes an upper block 20 and a guide plate 21, on the lower face of which a guide 22 having a guide insert 23 is provided for guiding and holding active action elements (see FIGS. 4a to 4c and FIG. 7). An annular arrangement of individual embossing segments 24 and 25 is located in the guide insert 23, which will be addressed in more detail in FIG. 5. The assembly of embossing segments 24 and 25 is held on the guide plate 21 by a guide holding plate 26, a pressure plate 27, a spacer ring 32, a lower pressure plate 28, and an intermediate plate 29.

FIGS. 5 and 6 show the annular arrangement of the embossing segments 24 and 25. The embossing segments 24 are fixed with respect to the embossing segments 25 and disposed offset from each other by gaps 30. As is shown in FIG. 6, the embossing segments 25, which are designed to be axially displaceable with respect to the embossing segments 24, are inserted into the gaps 30. The dimensions of the gaps 30 are matched to the widths b and lengths l of the roofs of the forming region U. The number of embossing segments 24 and 25 in the annular arrangement is dependent on the number of teeth 2 desired on the clutch body 1. If only tooth sections are required on the periphery of the clutch body 1, the annular arrangement is filled with filler pieces 31, as is illustrated in FIG. 6.

Figure 7:
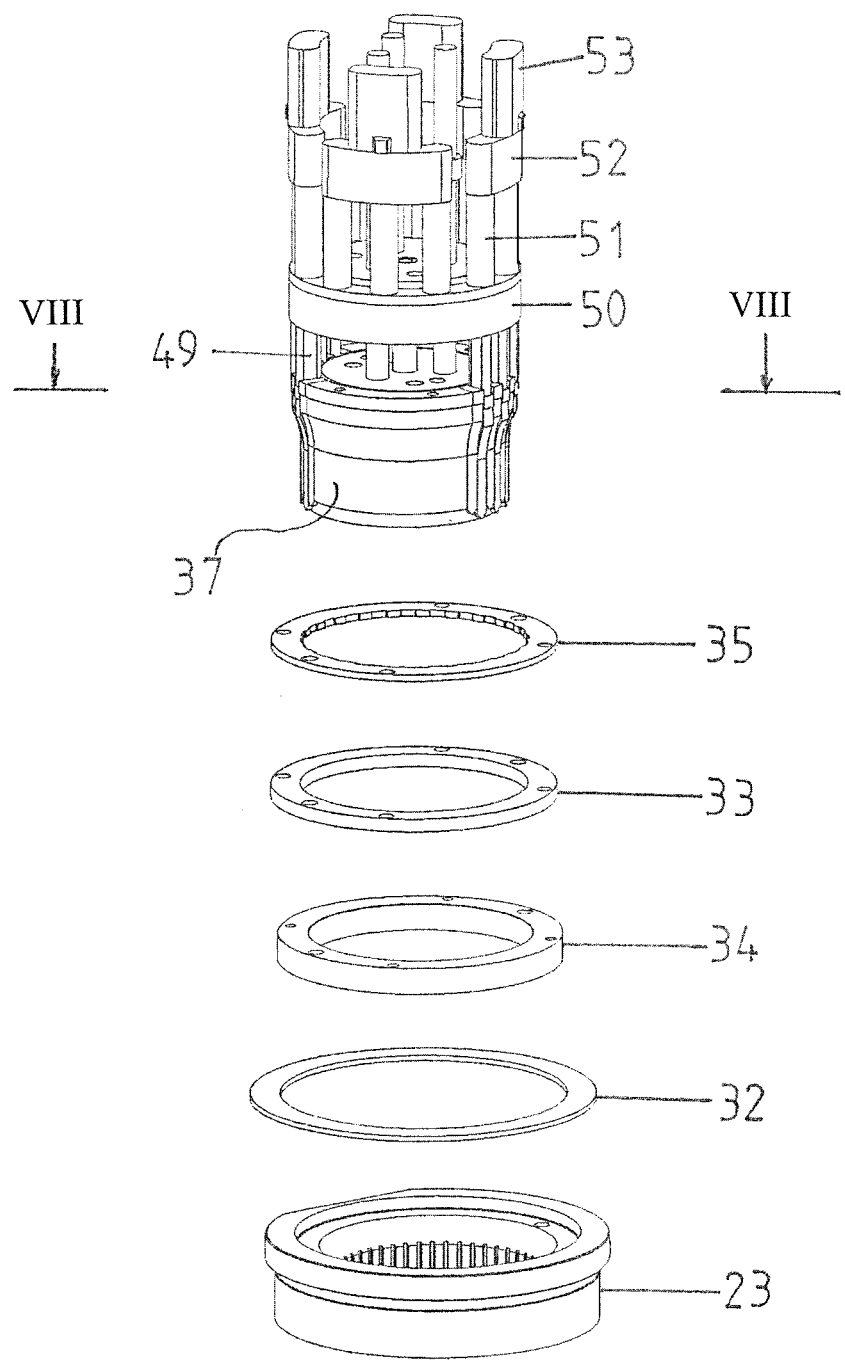
FIG. 7 shows a perspective illustration of an exploded view of the outer guide of the embossing segments.

FIG. 7 shows an exploded view of the outer lower guide of the annular arrangement of the embossing segments 24 and 25, which is formed from the guide insert 23, spacer rings 32, 33, an outer central holding plate 34, and an outer upper holding plate 35. At the wall sections thereof facing the embossing segments 24 and 25, the guide insert 23 and the upper holding plate 35 are provided with axially extending groove-shaped regions for the embossing segments 24 and 25.

Figure 8:
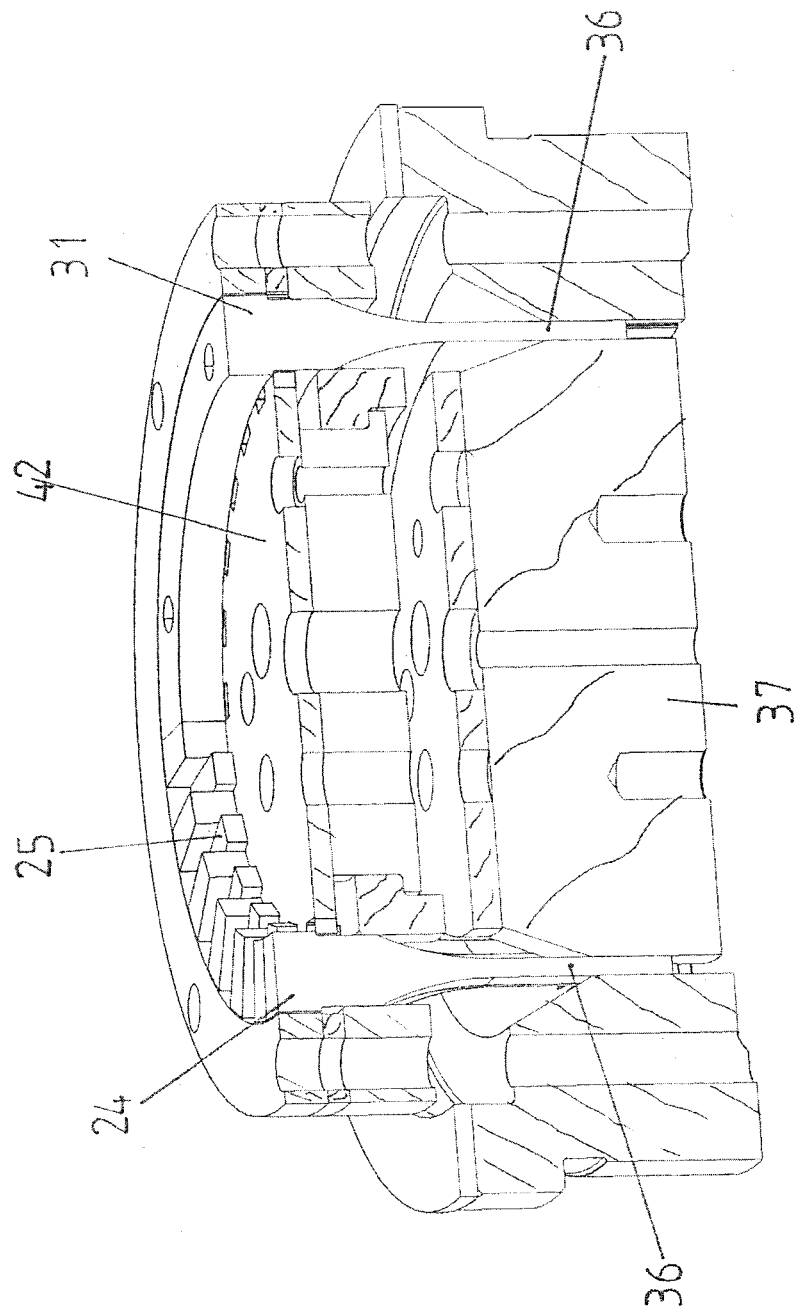
FIG. 8 shows a section along line VIII-VIII from FIG. 7.

FIG. 8 illustrates the inner guide of the embossing segments 24 and 25 in a section along line A-A of FIG. 7. The embossing segments 24 and 25 are guided along the shafts 36 thereof, on the inside, by the ejector 37.

Figure 9:
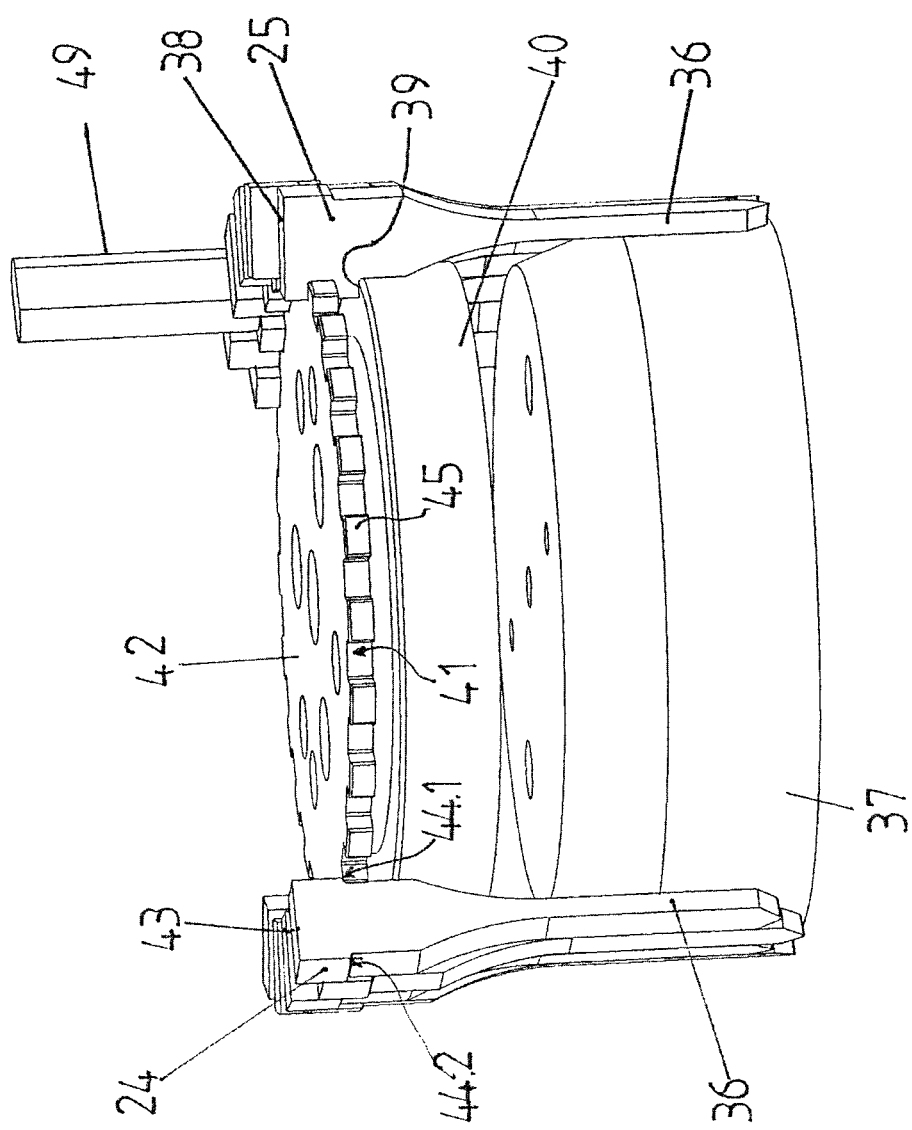
FIG. 9 shows a perspective illustration of the inner guide of the movable embossing segments.

As is apparent from FIG. 9, the shoulder 39 of the axially displaceable embossing segment 25 formed with respect to the shaft 36, at the head 38, is seated on a ring 40 associated with the ejector 37 in the lower end position. The shoulder 39 thus limits the axial movement in the manner of a stop, The head 38 of the embossing segment 25 is seated in the toothed ring-like cut-outs 41 of the inner holding plate 42, so that the embossing segment 25 is radially secured during the axial movement thereof. On one side, the embossing segments 24 are seated, by way of an inner shoulder 44.1 formed at the respective head 43, on the teeth 45 of the inner holding plate 42 and, on the other side, they are secured on the outer shoulder 44.2 of the head 43 by the outer holding plate 35, wherein the head surfaces of the embossing segments 24 are supported on the pressure plate 27, so that the embossing segments 24 are fixed and can only carry out the embossing movement thereof during a downward movement of the upper block 20. The heads 43 of the embossing segment 24 protrude a certain degree in relation to the heads 38 of the embossing segments 25, this degree being matched to the axial travel of the embossing segments 25, so that, initially all movable embossing segments 25 of section B, and subsequently all fixed embossing segments 24 of section A, engage the blank 8 supported on an embossing anvil 57.

In other words, in the annular arrangement, the movable embossing segments 25 form a shared section B made of the 2nd, 4th, 6th and nth embossing segments of the embossing segments 25, and the fixed embossing segments 24 form a shared embossing segment A made of the 1st, 3rd, 5th to n-1 th embossing segments of the embossing segments 24. The fixed and movable embossing segments 24 and 25 can form a completely closed annular arrangement, as well as one that is supplemented by filler pieces 31, so that clutch bodies 1 having different numbers of teeth and configurations can be created.

All embossing segments 25 operate simultaneously in the first embossing section A and impress the roofs 11 into the surface region of the blank 8 close to the edge between the tip circle FK and the roof circle KK, the roofs converging in the troughs 12, and in each case, two roofs 11 together with the trough 12 thereof are spaced from neighboring roofs by a gap 10. Likewise, in the second embossing section B, the fixed embossing segments 24 emboss the roofs 11 together with troughs 12 into the gaps 10, so that a closed forming region U close to the edge is formed on the blank 8, which is formed of roofs 11 and troughs 12 disposed next to each other in a toothed ring-like manner and oriented in the direction of the upper face of the blank 8.

Figure 10A:
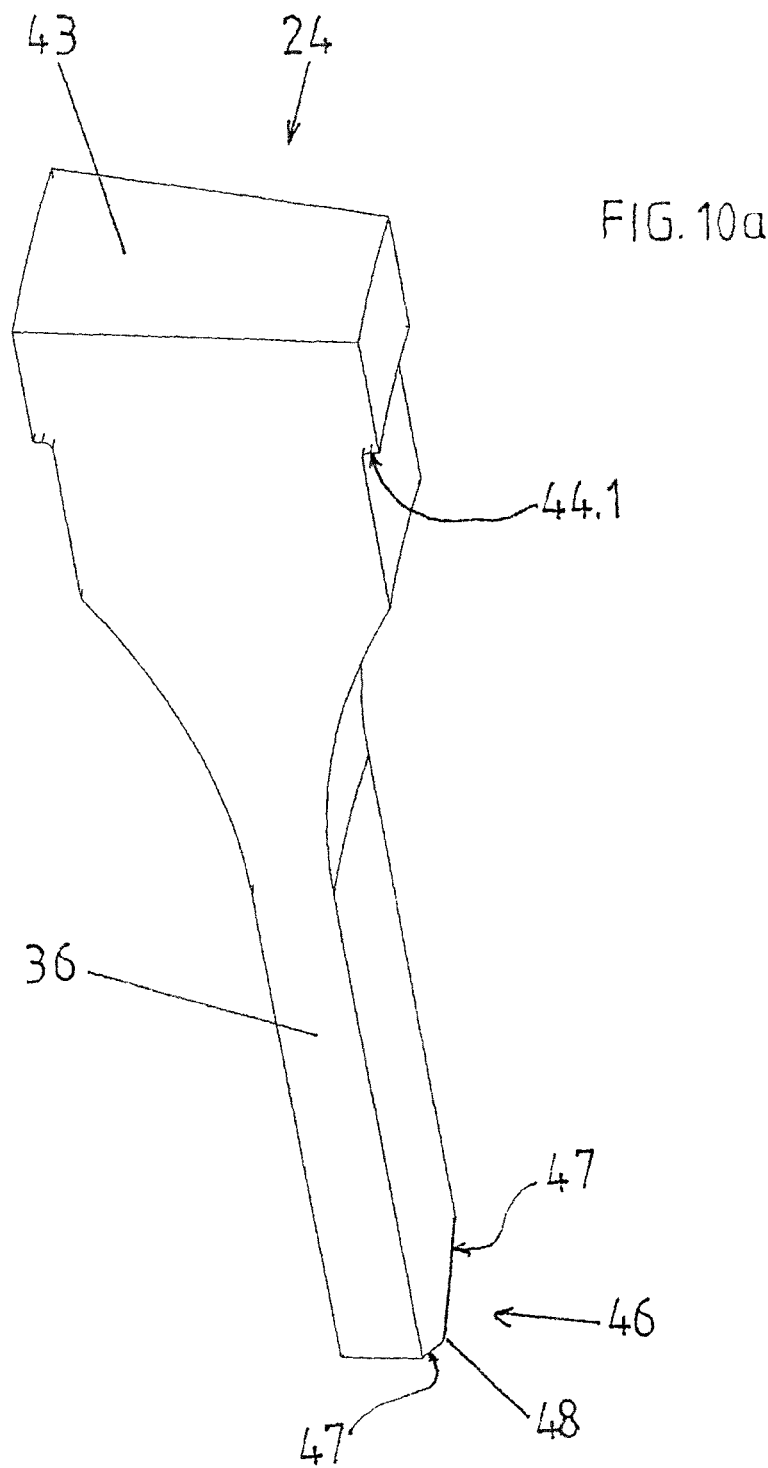
FIGS. 10a and 10b show perspective views of a fixed and a movable embossing segment.
Figure 10B:
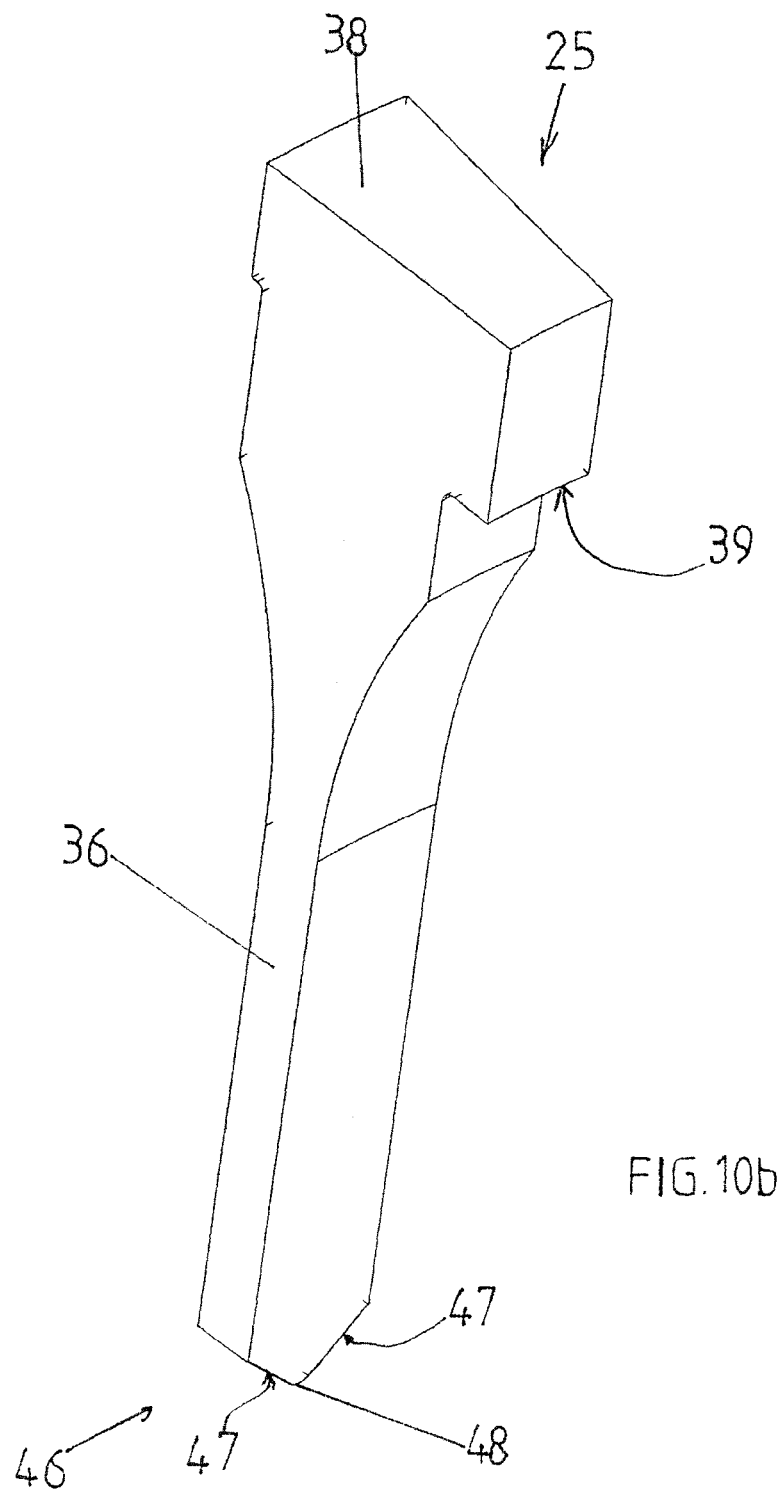

FIGS. 10a and 10b show the designs and shapes of the embossing segments 24 and 25, according to which the shaft 36 and the embossing foot 46 of the two embossing segments 24 and 25 have the same shapes and dimensions. The embossing foot 46 has roof-like embossing surfaces 47, which converge in a ridge 48. The ridge 48 of the embossing foot 46 is disposed so as to end up seated vertically between the root circle FK and the tip circle KK and corresponds to the position of the trough 12.

The shoulder 39 of the embossing segment 25 is considerably deeper than the inner shoulder 44.1 of the embossing segment 24, so that the head 38 of the embossing segment 25 is held securely in the cut-out 41 of the inner holding plate 42. The two heads 38 and 43 have a slightly tapered shape toward the center of the root circle FK or tip circle KK, so that the embossing segments 24 and 25, when disposed next to each other, can form a closed annular arrangement.

Figure 11:
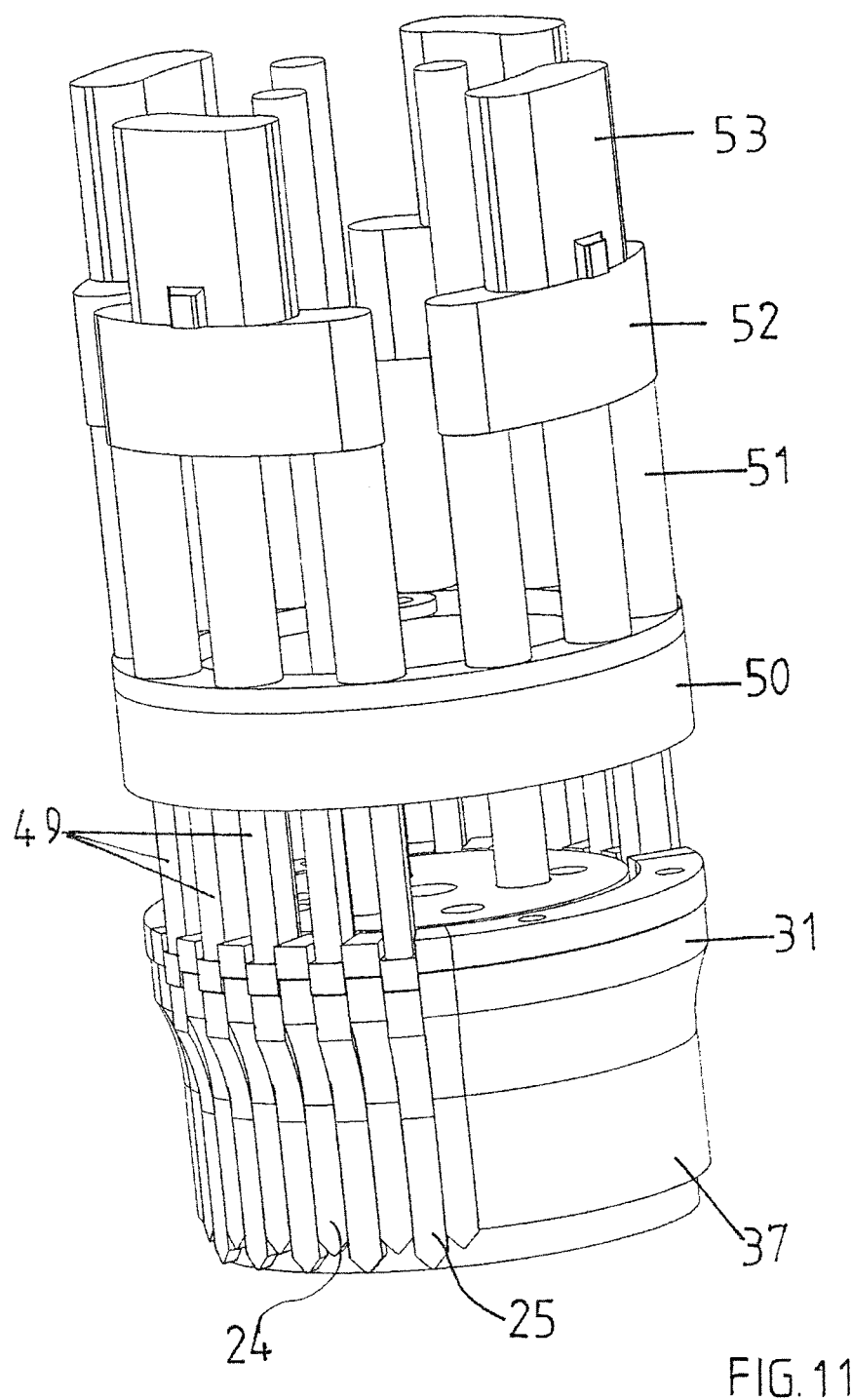
FIG. 11 shows a perspective illustration of one example of even pressure application of the movable embossing segments comprising filler pieces.

FIG. 11 shows pressure application of the movable embossing segments 25, which are acted upon in accordance with the annular arrangement of the embossing segments by pressure pieces 49 that are in force fit with a pressure piece ring 50, on which pressure pins 51 are evenly distributed. Three pressure pins are combined respectively under a bridge 52 and are subjected to pressure by a hydraulic system, which is not shown in greater detail, by way of a pressure piece 53 so as to carry out a axial movement preceding that of the fixed embossing segments 24 in order to sequentially emboss the roofs 11 and troughs 12 in the region of the blank 8 close to the edge.

Figure 12:
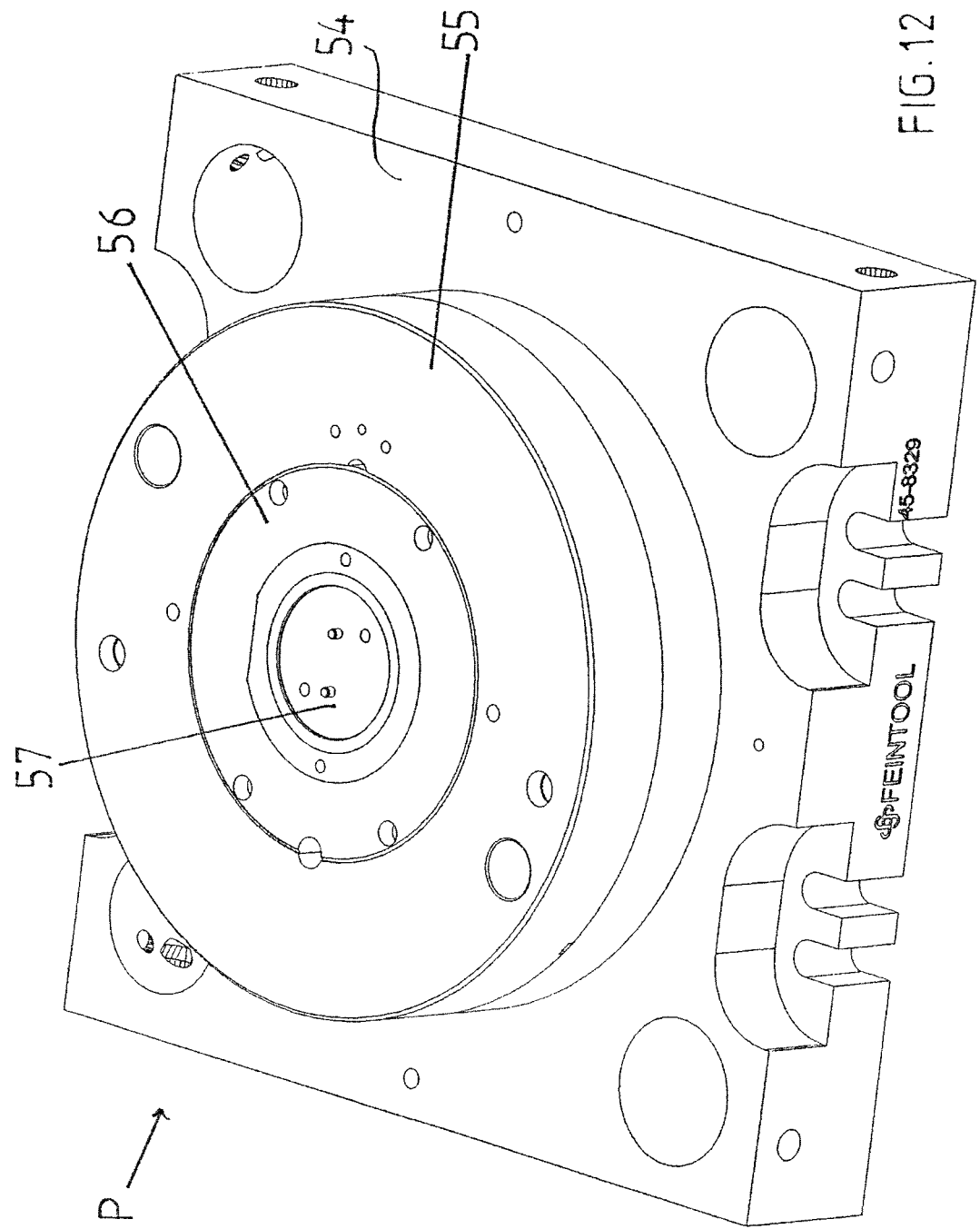
FIG. 12 shows a perspective illustration of the assembly of the embossing anvil of the embossing stage on the lower block of the device according to the invention.

FIG. 12 shows the lower part 19 of the embossing stage P comprising the lower block 54, which at the upper face thereof facing the upper block 18 carries a cavity frame 55. A cavity insert 56 is inserted into the cavity frame 55, in which pressure can be applied to an embossing anvil 57 of the embossing stage P via a pressure plate, which is not shown in greater detail, to absorb the embossing forces. The embossing anvil 57 has a planar circular shape, the diameter of which is matched to the diameter D of the blank 8.

Reference is now made to the trimming stage BS of the device according to the invention. The trimming stage BS is essentially composed of a cutting punch accommodated in an upper part, a guide plate or knife-edge ring plate, an ejector and corresponding pressure pins, and a die plate disposed in a lower part, an ejector, and pressure pins. Such a system corresponds to the prior art and therefore the design need not be illustrated in more detail. It goes without saying that the geometries and shapes of the cutting punch and of the die plate are matched appropriately for cutting the troughs 12 free.

FIGS. 13 to 18 now describe the undercutting and shaping stage HK device according to the invention in more detail.

Figure 13:
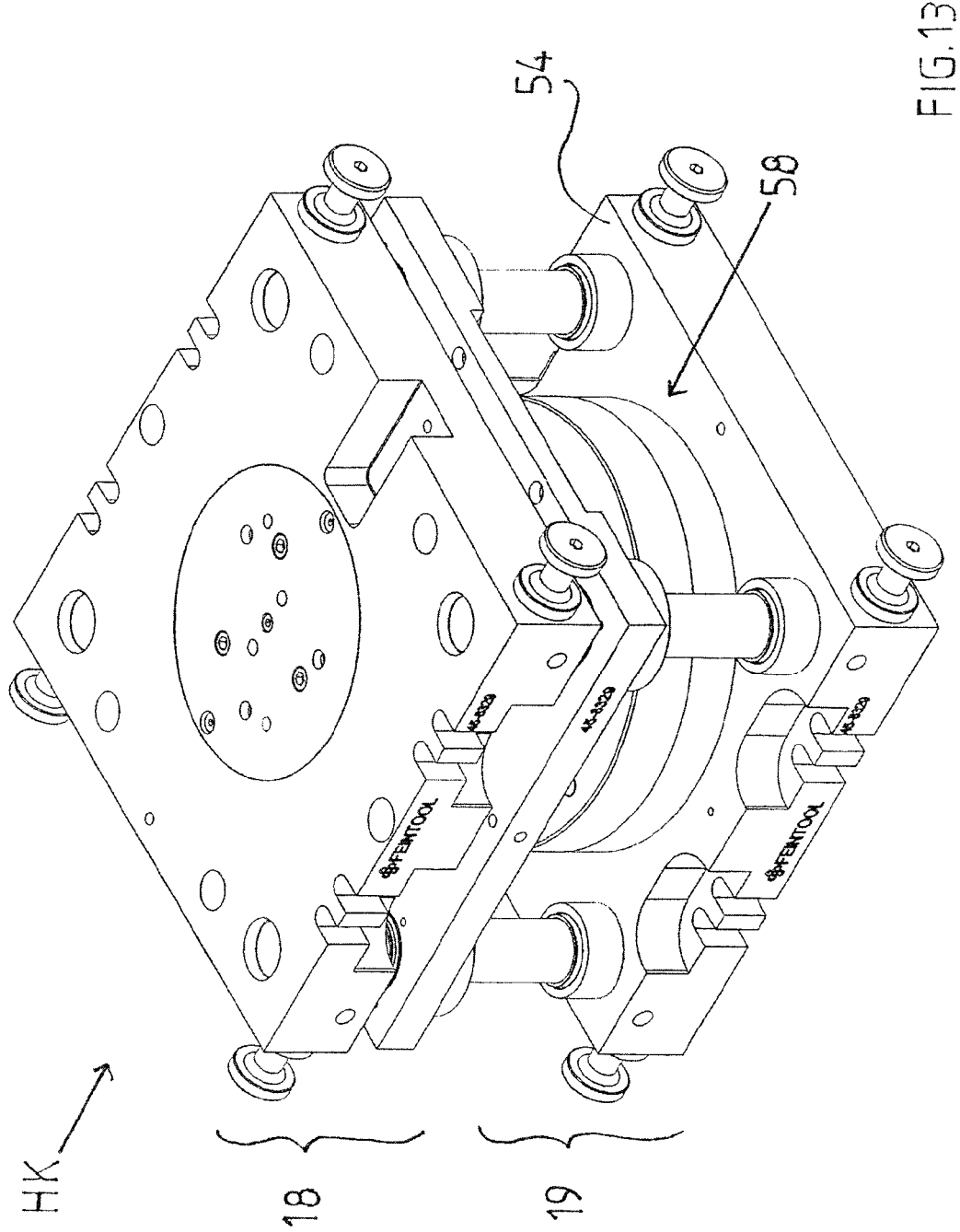
FIG. 13 shows a perspective view of the undercutting and shaping stage of the device according to the invention.
Figure 14:
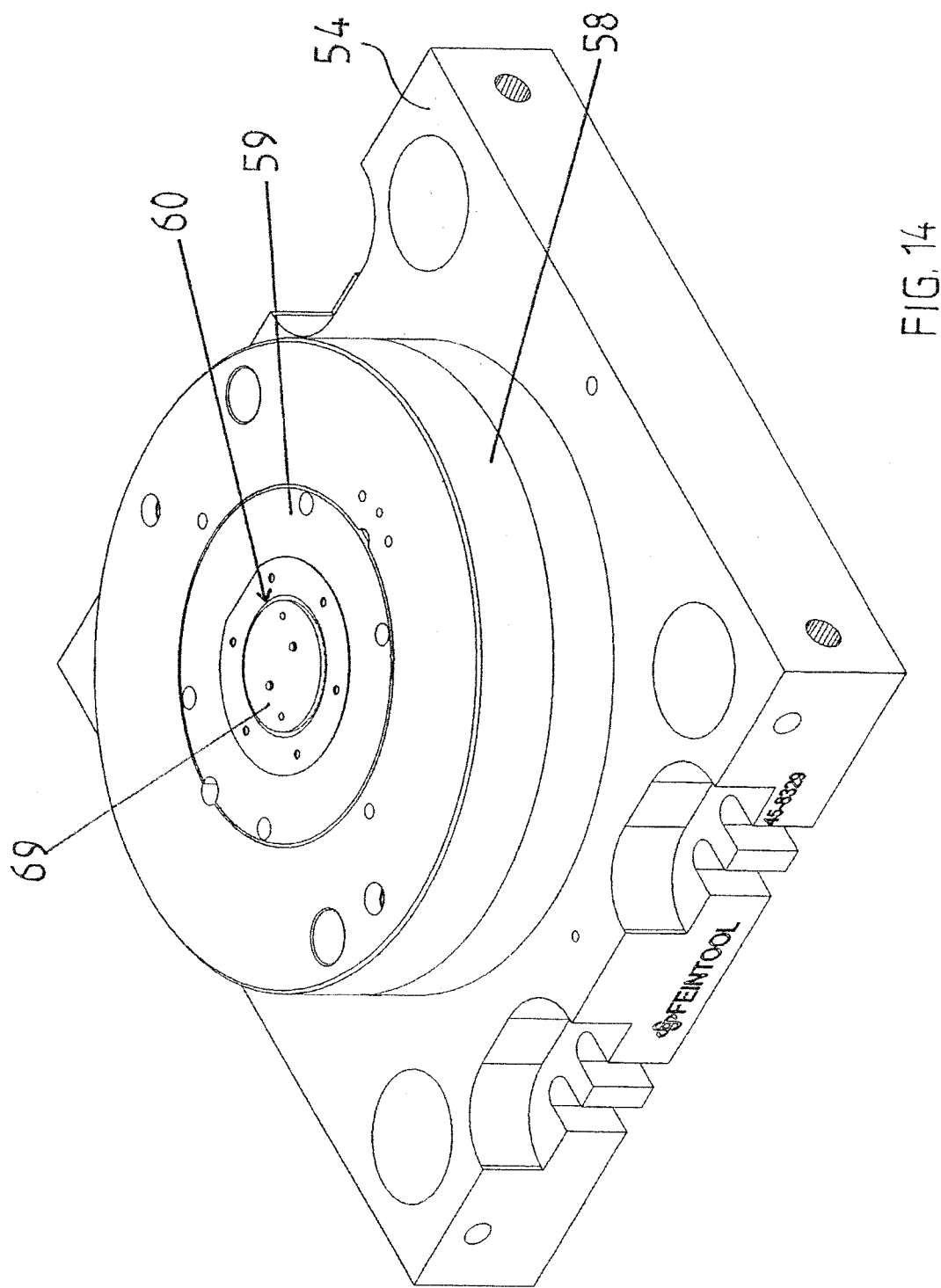
FIG. 14 shows a perspective view of the cavity side of the undercutting and shaping stage on the lower block of the device according to the invention.

FIG. 13 shows a perspective view of the undercutting and shaping stage HK, which similarly to the embossing stage P is composed of an upper part 18 and a lower part 19. The lower block 54 of the lower part 19 carries a cavity frame 58, in which a cavity insert 59 is inserted, which accommodates an embossing die 60 (see FIG. 14).

Figure 15:
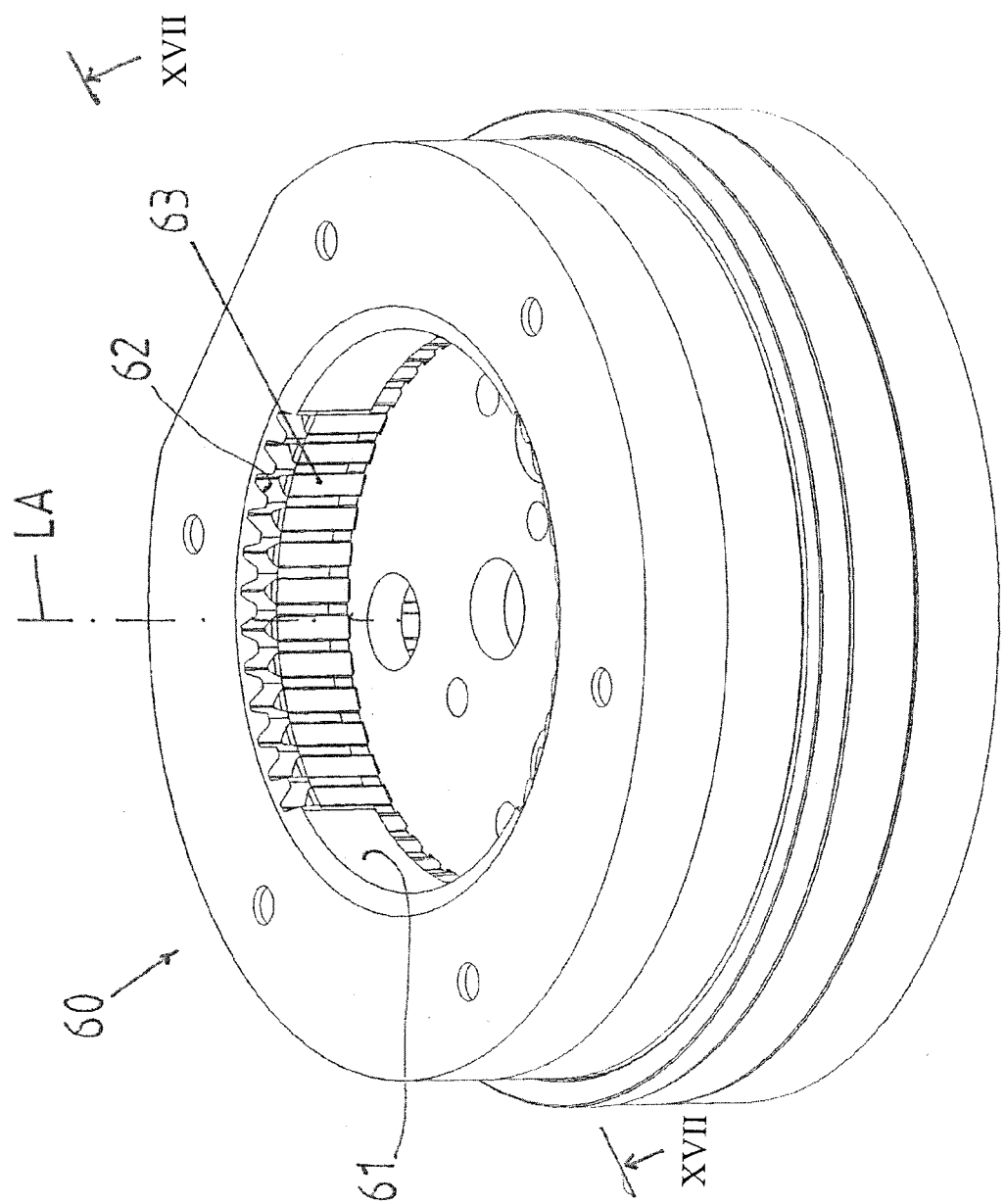
FIG. 15 shows a perspective illustration of the embossing die of the undercutting and shaping stage, without the upper block.

As is shown in FIG. 15, the embossing die 60 has a sleeve-like design. Prismatic cut-outs 62, in which embossing punches 63 can be axially guided, are introduced into the inner wall 61 of the embossing die 60 in the direction of the die axis LA. The cut-outs 62 are disposed so that they correspond to the respective cut-free troughs 12 on the blank 8, so that the embossing punches 63 can each work the tooth flanks 16.1 and 16.2 of two adjoining tooth bodies 15.

Figure 16:
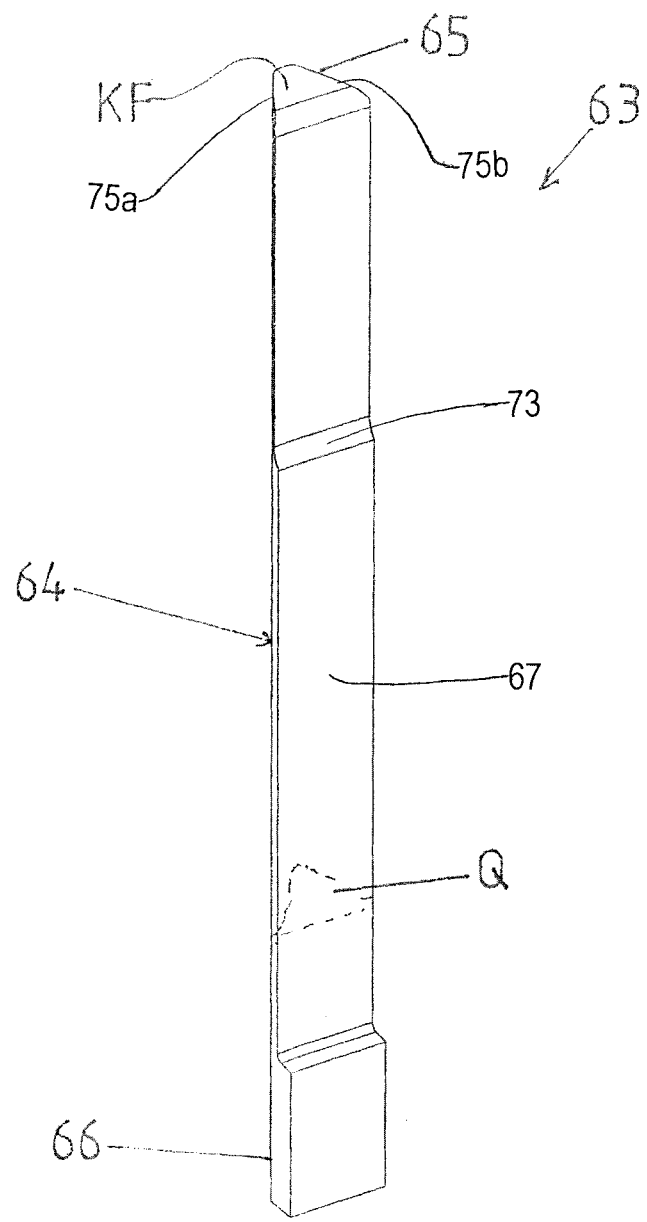
FIG. 16 shows a view of an embossing punch.

FIG. 16 shows an embossing punch 63, which has an elongated prismatic shaft 64 having a head 65 and a foot 66. The head 65 has a head surface KF, the shape and geometry of which correspond to the troughs 12 formed from the roofs 11. The shaft 64 has a cross-section Q that decreases slightly from the foot 66 to the head 65, so that a conicity is created across the length of the shaft. The conicity is matched to the desired undercutting angle $\alpha$ of the tooth flanks 16.1 and 16.2, so that the tooth flanks 16.1 and 16.2 of the tooth body can be deformed in the desired range by facing lateral faces 75a, 75b of the shaft 64.

Figure 17:
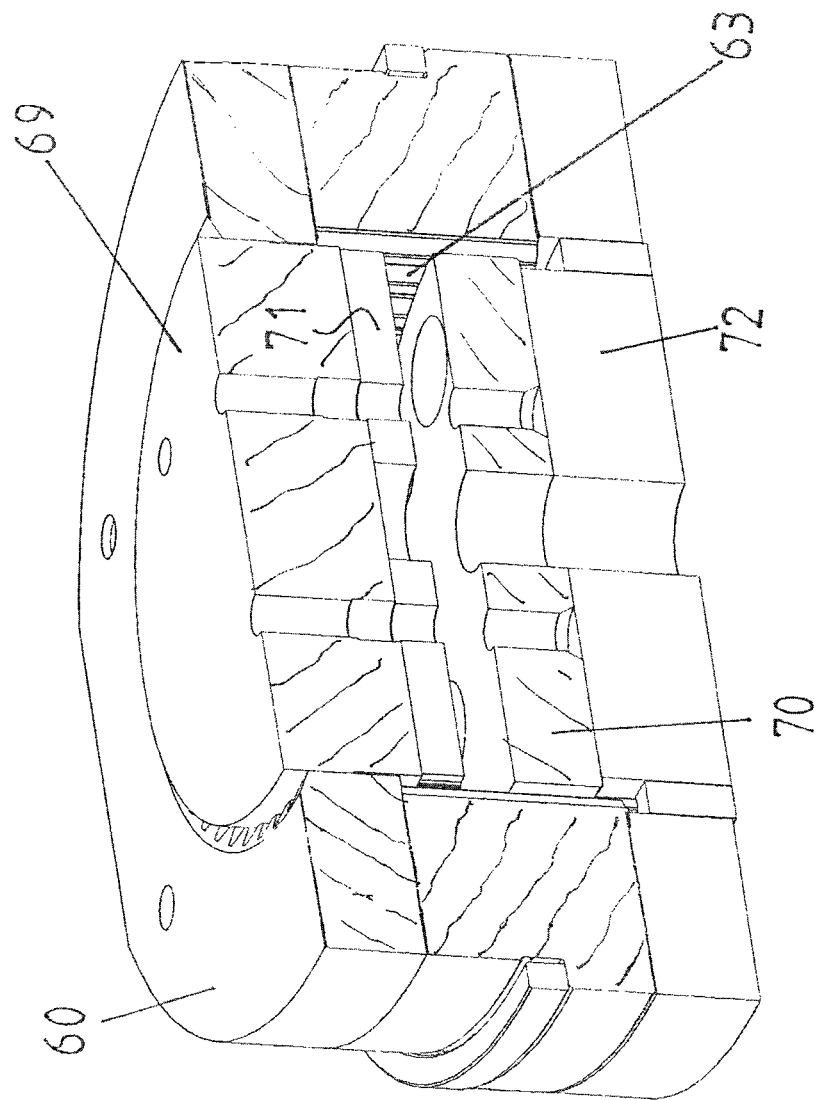
FIG. 17 shows a section according to line B-B from FIG. 14.

FIG. 17 shows a section along line B-B of FIG. 15, which illustrates the inner support of the embossing punches 63 in the embossing die 60. The feet 66 of the embossing punches 63 are seated on a pressure piece ring 68, which is in turn attached to a cavity pressure plate (not shown in detail). A pressure pad 69, holding plates 70 and 71, and a pressure plate 72 for the pressure pad 69 are part of the inner radial support and guidance.

With reference to FIG. 17 in conjunction with FIG. 16, the side of the shaft 64 facing the pressure pad 69 and the holding plate 71 has protrusions 73, on which the pressure pad 69 and the holding plate 71 are seated.

FIG. 18 shows a sectional illustration through the embossing die 60 forming part of the lower block 19 and the annular shaping anvil 74, which forms part of the upper block 18 and has a shape that is adapted to the future roof shape of the teeth 2, on the side thereof facing the embossing die 60.

The blank 8, which is cut free in the troughs 12 and provided with tooth flanks 16.1 and 16.2, is located between the embossing die 60 and the shaping anvil 74 so that, during the feed motion, the embossing punches 63 enter the cut-free region of the tooth bodies 15 with the lower block 54 and thereby undercuts the tooth flanks 16.1 and 16.2 in the desired angular position, while the shaping surface of the shaping anvil 74 at the same time creates a shaped roof shape on the tooth.

The invention claimed is:

1. An apparatus for producing clutch bodies, which are suitable for synchronizer systems and provided with teeth from a blank, comprising
at least one embossing stage, comprising first and second embossing segments and an anvil, for embossing roofs and troughs between root and tip circles into an upper face of the blank,
wherein the first embossing segments and the second embossing segments are configured for sequential embossing within the embossing stage, wherein the first embossing segments first emboss a first section on the blank, then return in relation to the second embossing segments, and thereafter the second embossing segments emboss the second section on the blank, such that the first and second sections embossed respectively by the first and second embossing segments each comprises roofs and troughs, and wherein the first and second embossing segments are disposed next to each other and comprise an annular arrangement, and the second embossing segments are configured to be axially movable relative to the first embossing segments and the first embossing segments are configured to be axially fixed relative to the second embossing segments, and the apparatus further comprises the following:

a) a trimming stage for cutting the troughs free, to form tooth bodies that project upwardly at an end face on the blank and have tooth flanks and roofs without further embossing; and b) an undercutting and shaping stage for undercutting the tooth flanks and for shaping the roofs of the tooth bodies to a final shape, the undercutting and shaping stage comprising embossing punches and a shaping anvil cooperating with the embossing punches.

2. The apparatus according to claim 1, wherein the at least one embossing stage is configured so that the roofs together with the troughs of the first section and the second section form a shared forming region which is disposed between the root and tip circles of the subsequently finally shaped teeth close to an edge in the blank.

3. The apparatus according to claim 1, wherein the first and second embossing segments alternate and comprise at least a portion of the annular arrangement, and the diameter of the annular arrangement corresponds to the tip circle of the subsequently finally shaped teeth.

4. The apparatus according to claim 1, wherein the first section consists of a portion of the blank embossed by the first embossing segments and a portion of the blank which aligns with at least one filler piece.

5. The apparatus according to claim 1, wherein the first and second embossing segments each comprise a shaft having an embossing foot which has embossing surfaces having identical shapes and dimensions and a roof ridge, wherein the roof ridge is oriented perpendicularly to the root circle and the tip circle.

6. The apparatus according to claim 5, wherein the shafts of the first and second embossing segments comprise trapezoidal heads, which have protruding shoulders with respect to the shafts, wherein the shoulders of the second embossing segments limit the axial movement of the second embossing segments relative to an inner holding plate, and the heads are laterally guided by cut-outs on an outer circumference of the inner holding plate and spaced by teeth which alternate with the cut-outs on the circumference of the inner holding plate, and the shoulders of the first embossing segments are held on the teeth of the inner holding plate by a pressure plate, so that the first embossing segments are fixed with respect to the second movable embossing segments.

7. The apparatus according to claim 1, wherein respective first pressure pieces engage each of the second embossing segments for transmitting the axial movement, the pressure pieces are operatively connected to a pressure piece ring on which pressure pins are evenly distributed, multiple pressure pins are combined to form respective groups, each group under a respective bridge, each of the bridges being engaged by a respective second pressure piece.

8. The apparatus according to claim 1, wherein at least one cutting punch, a die plate and an ejector are provided in the trimming stage, the geometries of which are adapted to the tooth flank shape of the subsequently finally shaped teeth.

9. The apparatus according to claim 1, wherein a sleeve shaped embossing die is provided for undercutting and shaping the tooth body in the undercutting and shaping stage, the inner wall of the embossing die being provided with cut-outs between the root and tip circles which are disposed parallel to an axis of the die and which are positioned so that they are associated in each case with the troughs, wherein embossing punches are disposed in the cut-outs, the embossing punches each comprise a shaft having a conically increasing cross-section in a direction of movement thereof for undercutting the tooth flanks of the tooth body and a roof shaped head for shaping the roof shape, and the shaping anvil is provided having a shaping surface adapted to the roof shape and geometry of the finally shaped teeth.

10. The apparatus according to claim 9, wherein the embossing punches are held radially by a disk-shaped pressure pad and holding plates disposed on top of each other in the embossing die perpendicular to the die axis, and wherein the embossing punches each have a support side configured to have a face that faces end faces of the pressure pad and holding plates.

11. The apparatus according to claim 9, further comprising a pressure piece ring engaging each of the embossing punches at a foot end of the embossing punch.

12. The apparatus according to claim 10, wherein the embossing punches each have a prismatic elongated shape that is adapted to the tooth geometry, and wherein the support side is configured as a protrusion for supporting the holding plates and the pressure pad.

13. A method for producing clutch bodies, which are suitable for synchronizer systems, from a blank with an apparatus comprising an embossing stage having at least annularly arranged embossing segments and an anvil configured to form an annular arrangement of troughs and roofs into an end face of the blank in the vicinity of an edge of a circumference thereof by way of embossing along a root circle and tip circle of teeth to be formed, the method comprising;

a) introducing roofs and troughs into the blank by way of a first embossing step, in which the roofs together with the troughs are spaced at equal distances from each other in an annular arrangement, and by way of a second embossing step following the first embossing step, in which the spaces in the annular arrangement are filled with additional roofs and troughs, wherein the first embossing step and the second embossing step are carried out in a single embossing stage;

b) trimming the troughs to remove material at respective lowest points thereof, so that tooth bodies are created at the end face of the blank along the root circle with tooth flanks and roofs, without further embossing ; and c) undercutting the tooth flanks by way of embossing using embossing punches and shaping the roofs with a shaping anvil that is adapted to configured for the roof shape.

* * * * *